United States Patent
Akiyama et al.

(10) Patent No.: US 11,122,370 B2
(45) Date of Patent: Sep. 14, 2021

(54) GLASS SHEET COMPOSITE

(71) Applicant: AGC Inc., Chiyoda-ku (JP)

(72) Inventors: Jun Akiyama, Tokyo (JP); Shinya Tahara, Tokyo (JP); Daisuke Uchida, Tokyo (JP); Kento Sakurai, Tokyo (JP)

(73) Assignee: AGC Inc., Chiyoda-ku (JP)

( * ) Notice: Subject to any disclaimer, the term of this patent is extended or adjusted under 35 U.S.C. 154(b) by 70 days.

(21) Appl. No.: 16/549,040

(22) Filed: Aug. 23, 2019

(65) Prior Publication Data
US 2019/0387322 A1 Dec. 19, 2019

Related U.S. Application Data

(63) Continuation of application No. PCT/JP2018/006321, filed on Feb. 21, 2018.

(30) Foreign Application Priority Data

Feb. 23, 2017 (JP) .............................. JP2017-032650

(51) Int. Cl.
*H04R 7/08* (2006.01)
*B32B 7/05* (2019.01)
(Continued)

(52) U.S. Cl.
CPC .................. *H04R 7/08* (2013.01); *B32B 7/05* (2019.01); *B32B 17/10045* (2013.01);
(Continued)

(58) Field of Classification Search
CPC .............. H04R 2499/15; H04R 7/045; H04R 2440/05; H04R 2499/11; H04R 1/028;
(Continued)

(56) References Cited

U.S. PATENT DOCUMENTS

2002/0196401 A1* 12/2002 Grace ................. H01L 27/3281
349/158
2003/0231271 A1* 12/2003 Saitoh ............... G02F 1/133385
349/122
(Continued)

FOREIGN PATENT DOCUMENTS

JP 04-066284 6/1992
JP 05-198375 A 8/1993
(Continued)

OTHER PUBLICATIONS

International Search Report dated May 1, 2018 in PCT/JP2018/006321 filed Feb. 21, 2018 (with English Translation).
(Continued)

*Primary Examiner* — Alexander Krzystan
*Assistant Examiner* — Julie X Dang
(74) *Attorney, Agent, or Firm* — Oblon, McClelland, Maier & Neustadt, L.L.P.

(57) ABSTRACT

A glass sheet composite includes at least two sheets and a liquid layer held between the two sheets, and at least one of the two sheets being a glass sheet. In the glass sheet composite, the two sheets have been disposed so that an edge surface of one of the two sheets and an edge surface of the other sheet are not flush with each other to constitute a step portion having a stair-like shape in a cross-sectional view, and the glass sheet composite further comprising a seal material provided to the step portion to seal up at least the liquid layer.

20 Claims, 12 Drawing Sheets

(51) Int. Cl.
  *B32B 17/10* (2006.01)
  *H04R 31/00* (2006.01)
(52) U.S. Cl.
  CPC ........ *H04R 31/003* (2013.01); *B32B 2307/10* (2013.01); *B32B 2315/08* (2013.01); *H04R 2307/023* (2013.01)
(58) Field of Classification Search
  CPC .... H04R 2307/023; H04R 7/04; H04R 17/00; H04R 7/08; H04R 9/025; H04R 1/02; H04R 2307/025; H04R 5/02; H04R 7/02; H04R 7/06; H04R 9/06; H04R 9/066; H04R 1/025
  USPC .......................................................... 381/426
  See application file for complete search history.

(56) References Cited

U.S. PATENT DOCUMENTS

| | | | | |
|---|---|---|---|---|
| 2010/0208188 | A1* | 8/2010 | Tsai | H01L 51/5246 349/153 |
| 2015/0086048 | A1* | 3/2015 | Brown | B32B 17/064 381/152 |
| 2015/0201257 | A1* | 7/2015 | Zhou | H04R 7/045 381/152 |
| 2015/0368146 | A1* | 12/2015 | Ellison | C03C 4/0092 362/612 |
| 2016/0365391 | A1 | 12/2016 | Omata et al. | |
| 2017/0182753 | A1* | 6/2017 | Nakashima | B32B 27/00 |
| 2018/0297331 | A1* | 10/2018 | Gahagan | G02B 6/005 |

FOREIGN PATENT DOCUMENTS

| | | | | |
|---|---|---|---|---|
| JP | 05198375 A * | 8/1993 | | |
| JP | 05-227590 A | 9/1993 | | |
| JP | 06-325868 A | 11/1994 | | |
| JP | 2005-190683 A | 7/2005 | | |
| JP | 2005190683 A * | 7/2005 | | |
| JP | 2006-139971 A | 6/2006 | | |
| JP | 2009-100223 A | 5/2009 | | |
| JP | 2009100223 A * | 5/2009 | | |
| JP | 2009-151315 A | 7/2009 | | |
| WO | WO-2014061565 A1 * | 4/2014 | ........... | B32B 17/064 |
| WO | WO-2014103678 A1 * | 7/2014 | ....... | B32B 17/10798 |
| WO | WO-2015083248 A1 * | 6/2015 | ............. | C03C 3/122 |
| WO | WO-A1-2015-083248 | 6/2015 | | |
| WO | WO 2015/146495 A1 | 10/2015 | | |

OTHER PUBLICATIONS

Written Opinion dated May 1, 2018 in PCT/JP2018/006321 filed Feb. 21, 2018.
Mal, O, et al., "A Novel Glass Laminated Structure for Flat Panel Loudspeakers", AES Convention 124, 7343, May 2008, 6 pages.

* cited by examiner

GLASS SHEET COMPOSITE

TECHNICAL FIELD

The present invention relates to a glass sheet composite having good acoustic performance and also relates to a diaphragm and an opening member, using the glass sheet composite.

BACKGROUND ART

A cone paper or resin has been generally used as a diaphragm for loudspeakers or microphones. Such a material has a high loss coefficient, is hard to make resonant vibration, and thus, is regarded as having good sound reproduction performance in the audible range.

However, since the acoustic velocity is low in any of these materials, when a high frequency causes the material excitation, vibration of the material is less likely to follow the acoustic wave frequency, and divided vibration is readily occurred. It is therefore difficult to output a desired sound pressure particularly in a high-frequency range.

In recent years, the range required to be reproduced for a high-resolution sound source, etc. is a high-frequency region of 20 kHz or more. This region is a range supposed to be poorly audible by human ear, but it is preferred that the sonic vibration in the range above can be reproduced with high fidelity, because a stronger emotional impact is presented, for example, a realistic sensation is felt strongly.

Accordingly, it may be conceived that a material having a high velocity of sound propagation therethrough, such as a metal, ceramic, or glass, is used in place of the cone paper or resin. However, these materials each generally have a loss coefficient as low as about $1/10$ to $1/100$ of that of paper and, hence, unintended reverberant sound is likely to remain. Furthermore, when a member is excited to vibrate at its intrinsic vibration frequency, considerable tonal degradation may occur due to generation of a resonant mode.

BACKGROUND ART DOCUMENTS

Patent Literature

Patent Document 1: JP-A-5-227590

Non-Patent Literature

Non-Patent Document 1: Olivier Mal et. al., "A Novel Glass Laminated Structure for Flat Panel Loudspeakers", AES Convention 124, 7343.

SUMMARY OF INVENTION

Technical Problem

Known as diaphragms for loudspeakers are a diaphragm including one glass sheet (Patent Document 1) and a laminated glass having a 0.5 mm-thick polybutyl-based polymer layer between two glass sheets (Non-Patent Document 1). However, these diaphragms have a problem in that considerable tonal degradation occurs due to resonance.

Accordingly, an object of the present invention is to provide a glass sheet composite having good acoustic performance.

Solution to Problem

As a result of intensive studies, the present inventors have found that the problem above can be solved by constituting a certain glass sheet composite, and have accomplished the present invention.

The present invention is as follows:

<1> A glass sheet composite including at least two sheets and a liquid layer held between the two sheets, at least one of the two sheets being a glass sheet, in which the two sheets have been disposed so that an edge surface of one of the two sheets and an edge surface of the other sheet are not flush with each other to constitute a step portion having a stair-like shape in a cross-sectional view, the glass sheet composite further including a seal material provided to the step portion to seal up at least the liquid layer.

<2> The glass sheet composite according to <1>, in which the seal material adheres to the edge surface of one of the two sheets, an edge surface of the liquid layer, and a main surface of the other sheet in the step portion.

<3> The glass sheet composite according to <2>, in which the seal material, in a cross-sectional view, has an L-shaped contour extending along the edge surface of one of the sheets, the edge surface of the liquid layer, and the main surface of the other of the sheets.

<4> The glass sheet composite according to any one of <1> to <3>, in which the seal material has a taper surface.

<5> The glass sheet composite according to any one of <1> to <4>, in which the glass sheet has a specific modulus of $2.5 \times 10^7$ m$^2$/s$^2$ or higher.

<6> The glass sheet composite according to any one of <1> to <5>, in which the liquid layer has a viscosity coefficient at 25° C. of $1 \times 10^{-4}$ to $1 \times 10^3$ Pa·s and a surface tension at 25° C. of 15-80 mN/m <7> The glass sheet composite according to any one of <1> to <6>, in which the liquid layer has a thickness which is $1/10$ or less of a total thickness of the two sheets when the total thickness of the two sheets is 1 mm or less, and 100 μm or less when the total thickness of the two sheets is more than 1 mm.

<8> The glass sheet composite according to any one of <1> to <7>, which includes at least one of physically strengthened glass sheet or chemically strengthened glass sheet.

<9> The glass sheet composite according to any one of <1> to <8>, in which the two sheets each have a thickness of 0.01-15 mm.

<10> The glass sheet composite according to any one of <1> to <9>, in which the liquid layer comprises at least one member selected from the group consisting of a dimethyl silicone oil, a methyl phenyl silicone oil, a methyl hydrogen silicone oil, and modified silicone oils.

<11> The glass sheet composite according to any one of <1> to <10>, in which the seal material comprises at least one member selected from the group consisting of a poly(vinyl acetate)-based material, a poly(vinyl chloride)-based material, a poly(vinyl alcohol)-based material, an ethylene-copolymer-based material, a poly(acrylate)-based material, a cyanoacrylate-based material, a saturated-polyester-based material, a polyimide-based material, a linear-polyimide-based material, a melamine resin, a urea resin, a phenolic resin, an epoxy-based material, a polyurethane-based material, an unsaturated-polyester-based material, a reactive acrylic material, a rubber-based material, a silicone-based material, and a modified-silicone-based material.

<12> The glass sheet composite according to any one of <1> To <11> further including another glass sheet.

<13> The glass sheet composite according to any one of <1> to <12>, in which at least one glass sheet is made of a laminated glass.

<14> The glass sheet composite according to any one of <1> to <13>, in which at least one outermost surface has a coating or film formed thereon.

<15> The glass sheet composite according to any one of <1> to <14>, which has a curved surface shape.

<16> A diaphragm comprising the glass sheet composite according to any one of <1> to <15> and at least one vibrator disposed on one or both surfaces of the glass sheet composite.

<17> The diaphragm according to <16>, which has a circumferential length of 1 m or larger.

<18> An opening member comprising the glass sheet composite according to any one of <1> to <15> or the diaphragm according to <16> or <17>.

Advantageous Effects of Invention

The present invention, when applied, for example, to diaphragms for use in loudspeakers, microphones, earphones, mobile devices, etc., attains improvements in sound reproducibility over the region from a low sound range to a high-frequency range because of the low-resonance characteristics. Strength can also be ensured. Furthermore, when applied, for example, to opening members for buildings and vehicles, the present invention can exhibit high vibration damping capacity to render resonance less apt to occur, thereby inhibiting the generation of an abnormal noise attributed to resonance.

MODES FOR CARRYING OUT THE INVENTION

Figure 1A:
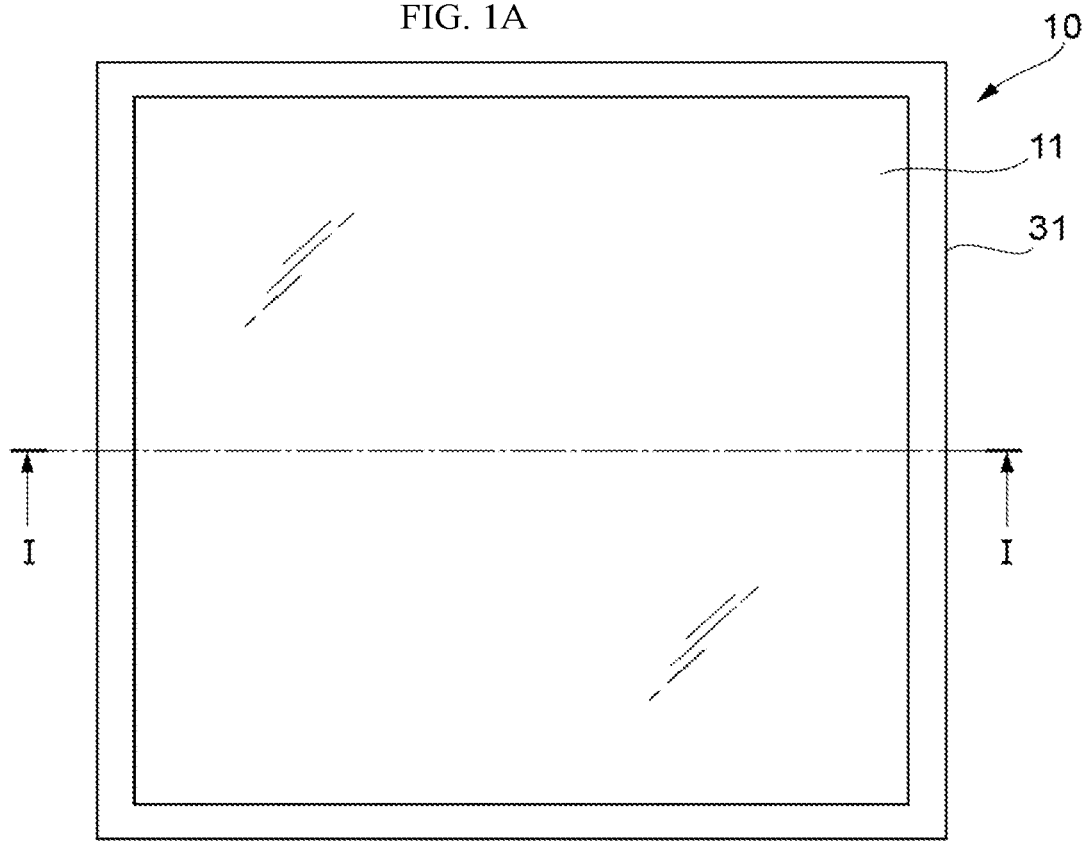
FIG. 1A is a plan view of a glass sheet composite according to a first embodiment of the present invention.

Details and other features of the present invention are described below based on embodiments of the present invention. Here, in the following drawings, the same or corresponding reference numeral is assigned to the same or corresponding members of parts, and duplicated description is thereby omitted. In addition, unless otherwise specified, the drawings are not intended to show a relative ratio among members or parts. Accordingly, specific dimensions may be properly selected in the context of the following non-limiting embodiments.

Furthermore, indicating a numerical range in the present description is used in the sense of including the numerical values set forth before and after the "–" as a lower limit value and an upper limit value.

(Outline of the Glass Sheet Composite)

The glass sheet composite according to the present invention is a glass sheet composite which includes at least two sheets and a liquid layer held between the two sheets and in which at least one of the two sheets is a glass sheet. In the glass sheet composite, the two sheets have been disposed so that an edge surface of one of the two sheets and an edge surface of the other sheet are not flush with each other to constitute a step portion having a stair-like shape in a cross-sectional view, and the glass sheet composite further includes a seal material provided to the step portion to seal up at least the liquid layer.

In the glass sheet composite, the two sheets have been disposed so that an edge surface of one of the two sheets and an edge surface of the other sheet are not flush with each other to constitute a step portion having a stair-like shape in a cross-sectional view. A seal material has been provided to the step portion to seal up at least the liquid layer. Due to this configuration, a glass sheet composite excellent in strength while maintaining low-resonance characteristics is rendered possible.

Specifically, the seal material adheres to the edge surface of one of the two sheets, an edge surface of the liquid layer, and a main surface of the other sheet in the step portion. In the case where the edge surface of one of the sheet, and the edge surface of the liquid layer are perpendicular to the main surface of the other sheet, the seal material, in a cross-sectional view, has an L-shaped contour. In the present invention, the term "main surface" means that portion of a surface of the other of the sheets which protrudes from the one of the sheets. This configuration improves the strength of the glass sheet composite.

The edge surface and the main surface may be curved surfaces in the case where the surfaces have been chamfered. In this case, the angle of the L-shape is not limited to right angle (90°). The angle thereof is preferably in the range of from larger than 0° to smaller than 180°, more preferably in the range of 30°-150°, still more preferably in the range of 60°-120°, especially preferably in the range of 80°-100°. The seal material may have the L-shaped contour wherein some of the seal material fills a space formed by chamfering the edge surface of said one sheet.

The seal material preferably has a taper surface. The term "taper surface" in the present invention means a surface constituting an inclined surface which obliquely faces the surface of either of the sheets (the edge surface of one sheet or the main surface of the other sheet) in the step portion. This configuration can bring the same effect as that obtained by processing a glass sheet composite.

The glass sheet composite according to the present invention preferably has a loss coefficient at 25° C. of $1\times10^{-2}$ or higher, and the at least one glass sheet preferably has a longitudinal wave acoustic velocity in the sheet thickness direction of $5.5\times10^3$ m/s or higher. Here, a high loss coefficient means that the vibration damping capacity is high.

As for the loss coefficient, a value calculated by a half-width method is used. Denoting f as the resonant frequency of a material and W as a frequency width at a point decreased by −3 dB from the peak value of the amplitude h (namely, the point of (maximum amplitude)−3 [dB]), the loss coefficient is defined as a value represented by {W/f}.

In order to prevent the resonance, the loss coefficient may be increased, namely, this means that the frequency width W becomes relatively large with respect to the amplitude h and the peak becomes broader.

Loss coefficient is a value inherent in a material, etc. For example, in the case of a glass sheet alone, the loss coefficient varies depending on the composition, relative density, etc. thereof. Loss coefficient can be determined by a dynamic modulus test such as a resonance method.

The term "longitudinal wave acoustic velocity" means a velocity at which a longitudinal wave propagates in a diaphragm. The longitudinal wave acoustic velocity and Young's modulus can be measured by the ultrasonic pulse method described in Japanese Industrial Standards (JIS-R1602-1995).

(Liquid Layer)

Since the glass sheet composite according to the present invention includes a layer made of a liquid (liquid layer) disposed between at least two sheets (at least a pair of sheets), a high loss coefficient can be achieved. In particular, the loss coefficient can be made larger by controlling the viscosity and surface tension of the liquid layer to fall within suitable ranges.

This is considered attributed to the fact that, unlike the case of disposing a pair of sheets with an adhesive layer interposed therebetween, the pair of sheets is not fixed and continues maintaining the vibration characteristics of each individual sheet.

The liquid layer preferably has a viscosity coefficient at 25° C. of $1\times10^{-4}$ to $1\times10^3$ Pa·s and a surface tension at 25° C. of 15-80 mN/m. In case where the viscosity thereof is too low, this liquid layer is less apt to transmit vibrations. In case where the viscosity thereof is too high, the two sheets respectively on both sides of the liquid layer are fixed to exhibit a vibration behavior as one sheet, becoming less effective in damping resonant vibration. Meanwhile, in case where the surface tension thereof is too low, the sheets have reduced adhesion therebetween and are less apt to transmit vibrations. In case where the surface tension thereof is too high, the two sheets respectively on both sides of the liquid layer are apt to be fixed to exhibit a vibration behavior as one sheet, becoming less effective in damping resonant vibration.

The viscosity coefficient at 25° C. of the liquid layer is more preferably $1\times10^{-3}$ Pa·s or higher, still more preferably $1\times10^{-2}$ Pa·s or higher. The viscosity coefficient thereof is more preferably $1\times10^2$ Pa·s or less, still more preferably $1\times10$ Pa·s or less.

The surface tension at 25° C. of the liquid layer is more preferably 17 mN/m or higher, still more preferably 30 mN/m or higher.

The viscosity coefficient of the liquid layer can be measured with a rotational viscometer, etc. The surface tension of the liquid layer can be measured by a ring method, etc.

In case where the liquid layer has too high a vapor pressure, some of this liquid layer may vaporize, making the glass sheet composite unable to perform its function. The vapor pressure at 25° C. and 1 atm of the liquid layer hence is preferably $1\times10^4$ Pa or less, more preferably $5\times10^3$ Pa or less, still more preferably $1\times10^3$ Pa or less.

The smaller the thickness of the liquid layer, the more the liquid layer is preferred from the standpoints of maintaining high rigidity and transmitting vibrations. Specifically, when the total thickness of the two sheets is 1 mm or less, the thickness of the liquid layer is preferably 1/10 or less, more preferably 1/20 or less, still more preferably 1/30 or less, yet still more preferably 1/50 or less, even still more preferably 1/70 or less, even yet still more preferably 1/100 or less, of the total thickness of the two sheets.

In the case where the total thickness of the two sheets exceeds 1 mm, the thickness of the liquid layer is preferably 100 μm or less, more preferably 50 μm or less, still more preferably 30 μm or less, yet still more preferably 20 μm or less, even still more preferably 15 μm or less, even yet still more preferably 10 μm or less.

A lower limit of the thickness of the liquid layer is preferably 0.01 μm or larger from the standpoints of film-forming property and durability.

It is preferable that the liquid layer is chemically stable and does not react with either of the two sheets lying respectively on both sides of the liquid layer.

The wording "chemically stable" means, for example, that the liquid layer is less apt to be altered (deteriorated) by light irradiation or that the liquid layer undergoes none of solidification, vaporization, decomposition, discoloration, chemical reaction with the glass, and the like at least in the temperature range of −20° C. to 70° C.

Examples of ingredients usable as the liquid layer include water, oils, organic solvents, liquid polymers, ionic liquids, and mixtures of two or more of these.

More specific examples thereof include propylene glycol, dipropylene glycol, tripropylene glycol, straight silicone oils (dimethyl silicone oil, methyl phenyl silicone oil, and methyl hydrogen silicone oil), modified silicone oils, acrylic-acid-based polymers, liquid polybutadiene, glycerin paste, fluorochemical solvents, fluororesins, acetone, ethanol, xylene, toluene, water, mineral oil, and mixtures of two or more of these. It is preferable that the liquid layer includes at least one member selected from the group consisting of propylene glycol, a dimethyl silicone oil, a methyl phenyl silicone oil, a methyl hydrogen silicone oil, and modified silicone oils, among those. It is more preferable that the liquid layer includes propylene glycol or a silicone oil as a main component.

Also usable as the liquid layer besides those ingredients is a slurry containing particles dispersed therein. Although the liquid layer preferably is a homogeneous fluid from the standpoint of improving the loss coefficient, the slurry is effective in the case of imparting design attractiveness or a function, such as coloration or fluorescence, to the glass sheet composite.

The content of the particles in the liquid layer is preferably 0-10 vol %, more preferably 0-5 vol %.

The particle diameter of the particles is preferably 10 nm to 10 μm, more preferably 0.5 μm or less, from the standpoint of preventing sedimentation.

The liquid layer may contain a fluorescent material from the standpoint of imparting design attractiveness or a function. This liquid layer may be either a slurry liquid layer which contains a particulate fluorescent material dispersed therein or a homogeneous liquid layer in which a liquid fluorescent material has been mixed. Thus, the optical function of absorbing light and luminescing can be imparted to the glass sheet composite.

(Sheets and Glass Sheets)

The glass sheet composite according to the present invention includes at least two (at least a pair of) sheets disposed so as to sandwich the liquid layer therebetween. At least one of the two sheets is a glass sheet. In this configuration, when either of the sheets resonates, the presence of the liquid layer can prevent the other sheet from resonating or can damp the resonant vibration of the other sheet. The glass sheet composite can hence have a higher loss coefficient than single glass sheets.

It is preferable that one of the two sheets constituting the pair of sheets differs from the other sheet in the peak top value of resonant frequency. It is more preferable that the ranges of resonant frequency of the two sheets do not overlap each other. However, even when the range of resonant frequency of one sheet and that of the other sheet overlap each other or when the two sheets have the same peak top value, the presence of the liquid layer prevents the resonance of one sheet from causing synchronous vibration to the other sheet and thereby reduces the resonance to some degree. A high loss coefficient can hence be obtained as compared with the case of single glass sheets.

More specifically, denoting $Q_a$ and $w_a$ respectively as the resonant frequency (peak top) and the half-width of resonance amplitude of one of the sheets and denoting $Q_b$ and $w_b$ respectively as the resonant frequency (peak top) and the half-width of resonance amplitude of the other sheet, it is preferable that the relationship represented by the following [formula 1] is satisfied.

$$(w_a+w_b)/4 < |Q_a-Q_b| \qquad \text{[formula 1]}$$

The larger the value of the left side of [formula 1], the larger the difference ($|Q_a-Q_b|$) in resonant frequency between the two sheets and the higher the loss coefficient. It is hence preferable that the two sheets have such properties.

Accordingly, it is more preferable that the following [formula 1'] is satisfied, and it is still more preferable that the following [formula 1"] is satisfied.

$$(w_a+w_b)/2 < |Q_a-Q_b| \qquad \text{[formula 1']}$$

$$(w_a+w_b)/1 < |Q_a-Q_b| \qquad \text{[formula 1"]}$$

The resonant frequency (peak top) and half-width of resonance amplitude of each sheet can be determined by the same method as the loss coefficient of the glass sheet composite.

The smaller the mass difference between one sheet and the other sheet, the more the sheets are preferred. It is more preferable that there is no mass difference therebetween. In cases when the sheets differ in mass, the resonance of the lighter sheet can be reduced by the heavier sheet but it is difficult to reduce the resonance of the heavier sheet by the lighter sheet. This is because if the mass ratio is imbalanced, resonant vibrations cannot theoretically be mutually eliminated due to the difference in inertial force.

The mass ratio between the two sheets which is represented by (one sheet)/(the other sheet) is preferably 0.8-1.25 (from 8/10 to 10/8), more preferably 0.9-1.1 (from 9/10 to 10/9), even more preferably 1.0 (10/10; mass difference, 0).

The smaller the thicknesses of one sheet and the other sheet, the more the sheets are apt to adhere to each other with the liquid layer interposed therebetween and the smaller the amount of energy necessary for vibrating the sheets. Hence, for use in diaphragm applications as in loudspeakers, the smaller the sheet thicknesses, the better. Specifically, the sheet thickness of each of the two sheets is preferably 15 mm or less, more preferably 10 mm or less, still more preferably 5 mm or less, yet still more preferably 3 mm or less, even still more preferably 1.5 mm or less, even yet still more preferably 0.8 mm or less. Meanwhile, too small thicknesses not only render surface defects of the sheets apt to exert an influence to cause cracking but also make the sheets difficult to strengthen. Hence, the thickness thereof is preferably 0.01 mm or larger, more preferably 0.05 mm or larger.

For use in opening member applications in buildings or vehicles, which are reduced in the occurrence of an abnormal noise attributed to a resonance phenomenon, the thicknesses of one sheet and the other sheet are each preferably 0.5-15 mm, more preferably 0.8-10 mm, still more preferably 1.0-8 mm.

It is preferable, for use in diaphragm applications, that one sheet and/or the other sheet has a high loss coefficient, because this enables the glass sheet composite to show enhanced vibration damping. Specifically, the loss coefficient at 25° C. of the sheet(s) is preferably $1 \times 10^{-4}$ or higher, more preferably $3 \times 10^{-4}$ or higher, still more preferably $5 \times 10^{-4}$ or higher. There is no particular upper limit, but the loss coefficient thereof is preferably $5 \times 10^{-3}$ or less from the standpoints of productivity and manufacturing cost. It is more preferable that both the one sheet and the other sheet have that loss coefficient.

The loss coefficient of each sheet can be determined by the same method as the loss coefficient of the glass sheet composite.

It is preferable, for use in diaphragm applications, that one sheet and/or the other sheet has a high longitudinal wave acoustic velocity in the sheet thickness direction, because the sound reproducibility in a high-frequency region is enhanced. Specifically, the longitudinal wave acoustic velocity of the sheet(s) is preferably $5.5 \times 10^3$ m/s or higher, more preferably $5.7 \times 10^3$ m/s or higher, still more preferably $6.0 \times 10^3$ m/s or higher. There is no particular upper limit, but the longitudinal wave acoustic velocity thereof is preferably $7.0 \times 10^3$ m/s or less from the standpoints of sheet productivity and raw material cost. It is more preferable that both the one sheet and the other sheet satisfy that acoustic velocity.

The acoustic velocity of each sheet can be measured by the same method as the longitudinal wave acoustic velocity of the glass sheet composite.

In the glass sheet composite according to the present invention, one sheet and/or the other sheet is constituted of a glass sheet. The material of the other sheet is not limited, and use can be made of non-glass sheets including a resin sheet made of a resin and a ceramic sheet made of a ceramic. From the standpoints of design attractiveness and processability, it is preferred to use a resinous sheet or a composite material thereof. Especially preferred is to use a resinous sheet made of an acrylic resin, a polyimide resin, a polycarbonate resin, a PET resin, or an FRP material. From the standpoint of vibration characteristics, it is preferred to use a ceramic material having high rigidity. More preferred are, for example, ceramics and single-crystal materials such as $Al_2O_3$, SiC, $Si_3N_4$, AlN, mullite, zirconia, yttria, and YAG. It is especially preferable that such ceramic materials are ones having light-transmitting properties. The other sheet is preferably a glass sheet.

The glass sheet which constitutes at least one sheet is not particularly limited in the composition thereof. However, the contents of components thereof are, for example, preferably in the following ranges in terms of mass % on oxide basis.

40-80 mass % $SiO_2$, 0-35 mass % $Al_2O_3$, 0-15 mass % $B_2O_3$, 0-20 mass % MgO, 0-20 mass % CaO, 0-20 mass % SrO, 0-20 mass % BaO, 0-20 mass % $Li_2O$, 0-25 mass % $Na_2O$, 0-20 mass % $K_2O$, 0-10 mass % $TiO_2$, and 0-10 mass % $ZrO_2$. These components account for at least 95 mass % of the entire glass.

More preferably, the composition of the glass includes the following components in amounts within the following ranges.

55-75 mass % $SiO_2$, 0-25 mass % $Al_2O_3$, 0-12 mass % $B_2O_3$, 0-20 mass % MgO, 0-20 mass % CaO, 0-20 mass % SrO, 0-20 mass % BaO, 0-20 mass % $Li_2O$, 0-25 mass % $Na_2O$, 0-15 mass % $K_2O$, 0-5 mass % $TiO_2$, and 0-5 mass % $ZrO_2$. These components account for at least 95 mass % of the entire glass.

The lower the specific gravity of each glass sheet, the smaller the amount of energy necessary for vibrating the glass sheet. Specifically, the specific gravity of each glass sheet is preferably 2.8 or less, more preferably 2.6 or less, still more preferably 2.5 or less. Although there is no particular lower limit, the specific gravity thereof is preferably 2.2 or higher.

A specific modulus is a value obtained by dividing the Young's modulus by the density, and the higher the specific modulus of each glass sheet, the higher the rigidity of the glass sheet. Specifically, the specific modulus of the glass sheet is preferably $2.5 \times 10^7$ $m^2/s^2$ or higher, more preferably $2.8 \times 10^7$ $m^2/s^2$ or higher, still more preferably $3.0 \times 10^7$ $m^2/s^2$ higher. Although there is no particular upper limit, the specific modulus thereof is preferably $4.0 \times 10^7$ $m^2/s^2$ or less from the standpoint of formability during glass production.

(Glass Sheet Composite)

The glass sheet composite according to the present invention is a glass sheet composite which includes at least two sheets and a liquid layer held between the two sheets and in which at least one of the two sheets is a glass sheet. The two sheets have been disposed so that an edge surface of one of the two sheets is not flush with, i.e., protrudes from, an edge surface of the other sheet to constitute a step portion having a stair-like shape in a cross-sectional view, and the glass sheet composite further includes a seal material provided to the step portion to seal up at least the liquid layer.

This configuration not only renders one of the two sheets easy to move relatively to the other sheet but also makes it easy to ensure strength. It is hence possible to obtain a glass sheet composite having excellent strength while retaining low-resonance characteristics. In the step portion, the protrusion amount of one of the two sheets, i.e., the dimensional difference (or offset), is as follows. In cases when the protrusion amount thereof is expressed in terms of proportion to the total thickness of the two sheets, the protrusion amount is preferably 0.1 time or more, more preferably 0.2 times or more, still more preferably 0.5 times or more, and is preferably 10 times or less, more preferably 5 times or less, still more preferably 2 times or less. In cases when expressed in terms of protrusion width, the protrusion amount is preferably 0.1 mm or larger, more preferably 0.2 mm or larger, still more preferably 0.5 mm or larger, and is preferably 30 mm or less, more preferably 15 mm or less, still more preferably 7.5 mm or less. Those lower limits of the protrusion amount were specified while taking into account of the strength of adhesion of the seal material to the sheets, the peel strength of the two sheets, the efficiency of bonding operation, etc., and those upper limits of the protrusion amount were specified while taking into account entirely of vibration characteristics and the like. The protrusion amount is expressed by the distance between the extremity of one sheet and the extremity of the other sheet.

Specifically, the seal material adheres to the edge surface of one of the two sheets, an edge surface of the liquid layer, and a main surface of the other sheet in the step portion. In the case where the edge surface of one of the sheets and the edge surface of the liquid layer are perpendicular to the main surface of the other sheet, the seal material, in a cross-sectional view, has an L-shaped contour. This configuration improves the strength of the glass sheet composite.

The seal material preferably has a taper surface. This seal material can produce the same effect as processing the glass sheet composite.

The seal material preferably includes at least one member selected from the group consisting of a poly(vinyl acetate)-based material, a poly(vinyl chloride)-based material, a poly(vinyl alcohol)-based material, an ethylene-copolymer-based material, a poly(acrylate)-based material, a cyanoacrylate-based material, a saturated-polyester-based material, a polyamide-based material, a linear-polyimide-based material, a melamine resin, a urea resin, a phenolic resin, an epoxy-based material, a polyurethane-based material, an unsaturated-polyester-based material, a reactive acrylic material, a rubber-based material, a silicone-based material, and a modified-silicone-based material.

In cases when the glass sheet composite has a high linear transmittance, this glass sheet composite is applicable as a light-transmitting member. Consequently, the visible light transmittance thereof determined in accordance with Japanese Industrial Standards (JIS R3106-1998) is preferably 60% or higher, more preferably 65% or higher, still more preferably 70% or higher.

Application examples of the light-transmitting member include transparent loudspeakers, transparent microphones, and opening members for buildings and vehicles.

It is useful to match the refractive indices in order to increase the transmittance of the glass sheet composite. Specifically, the closer the refractive indices of the glass sheets and liquid layer, which constitute the glass sheet composite, to each other, the more the interfacial reflection and interference are prevented. Such configuration is hence preferred. In particular, the difference in refractive index between the liquid layer and each of the pair of glass sheets in contact with the liquid layer is preferably 0.2 or less, more preferably 0.1 or less, still more preferably 0.01 or less.

It is possible to color at least one of the sheets and/or the liquid layer, which constitute the glass sheet composite. This is useful in the case where design attractiveness or a function, such as IR cut, UV cut, or privacy glass, is desired to be given to the glass sheet composite.

At least one glass sheet suffices for the sheets constituting the glass sheet composite, but two or more glass sheets may be used. In this case, glass sheets which all differ in composition may be used or glass sheets which all have the same composition may be used. Glass sheets having the same composition may be used in combination with a glass sheet having a different composition. Among others, it is preferred to use two or more kinds of glass sheets differing in composition, from the standpoint of vibration damping.

Similarly, as to the mass and thickness, the glass sheets may be all different, may be all the same, or some may be different. Above all, from the standpoint vibration damping, all of the constituent glass sheets preferably have the same mass.

A physically strengthened glass sheet or a chemically strengthened glass sheet may be used as at least one of the glass sheets constituting the glass sheet composite. This is useful in preventing the glass sheet composite from breaking. When an increase in the strength of the glass sheet composite is desired, it is preferable that a physically strengthened glass sheet or a chemically strengthened glass sheet is used as the glass sheet located in an outermost surface of the glass sheet composite, and it is more preferable that all of the constituent glass sheets are each a physically strengthened glass sheet or a chemically strengthened glass sheet.

From the standpoint of increasing the longitudinal wave acoustic velocity and the strength, it is also useful to use crystallized glass or phase-separated glass as a glass sheet. Especially when an increase in the strength of the glass sheet composite is desired, it is preferred to use crystallized glass or phase-separated glass as the glass sheet located in an outermost surface of the glass sheet composite.

A coating or a film may be formed on at least one outermost surface of the glass sheet composite, so long as the effects of the present invention are not impaired. Formation of a coating or attachment of a film is suitable for scratch protection, etc.

It is preferred that the thickness of the coating or film is ⅕ or less of the sheet thickness of the surface glass sheet. The coating and the film can be conventionally known ones. Examples of the coating include a water-repellent coating, a hydrophilic coating, a water sliding coating, an oil-repellent coating, a light reflection preventive coating, a heat shielding coating, and a highly reflective coating. Examples of the film include a glass anti-shatter film, a color film, a UV cut film, an IR cut film, a heat-shielding film, and an electromagnetic wave shielding film.

The shape of the glass sheet composite can be appropriately designed in accordance with applications, and may be a flat plate-like shape or a curved surface shape.

In order to raise the output sound pressure level in a low-frequency range, the glass sheet composite can be made to have a structure including an enclosure or a baffle plate. Although the material of the enclosure or baffle plate is not particularly limited, it is preferable to use the glass sheet composite of the present invention.

A frame may be provided to at least one outermost surface of the glass sheet composite so long as the effects of the present invention are not impaired. The frame is useful, for example, when it is desired to enhance the rigidity of the glass sheet composite or maintain a curved surface shape. As the material of the frame, a conventionally known material may be used. For example, use can be made of ceramics and single-crystal materials such as $Al_2O_3$, SiC, $Si_3N_4$, AlN, mullite, zirconia, yttria, and YAG, composite materials such as FRPs, resin materials such as acrylics and polycarbonates, glass materials, and wood.

The weight of the frame to be used is preferably 20% or less, more preferably 10% or less, of the weight of the glass sheet.

A seal member may be interposed between the glass sheet composite and the frame. Furthermore, at least some of the outer circumferential edge surface of the glass sheet composite may be sealed by a seal member which does not hinder the glass sheet composite from vibrating. As the seal members, use can be made of a highly elastic rubber, a resin, a gel, etc.

As the resin for the seal members, use can be made of acrylic, cyanoacrylate-based, epoxy-based, silicone-based, urethane-based, and phenolic resins. Examples of curing methods include one-pack type, two-pack mixing type, heat curing, ultraviolet curing, and visible light curing.

A thermoplastic resin (hot-melt bond) is also usable. Examples thereof include (ethylene/vinyl acetate)-based, polyolefin-based, polyamide-based, synthetic rubber-based, acrylic, and polyurethane-based resins.

As the rubber, use can be made of natural rubber, synthetic natural rubber, butadiene rubber, styrene-butadiene rubber, butyl rubber, nitrile rubber, ethylene-propylene rubber, chloroprene rubber, acrylic rubber, chlorosulfonated polyethylene rubber (Hypalon), urethane rubber, silicone rubber, fluororubber, ethylene-vinyl acetate rubber, epichlorohydrin rubber, polysulfide rubber (Thiokol), and hydrogenated nitrile rubber. In case where the thickness t of each seal member is too small, sufficient strength is not ensured. In case where the thickness t thereof is too large, the seal member may hinder vibrations. Consequently, the thickness of the seal member is preferably 10 μm or larger and up to 5 times the overall thickness of the glass sheet composite, and is more preferably 50 μm or larger and smaller than the overall thickness of the glass sheet composite.

At least some portions of the opposed surfaces of glass sheets may be coated with the seal member in order to, for example, prevent separation at the interface between each glass sheet and liquid layer of the glass sheet composite, so long as the effects of the present invention are not impaired. In this case, the area of the seal member-coated portion is preferably up to 20%, more preferably up to 10%, still more preferably up to 5%, of the area of the liquid layer so as not to hinder vibrations.

In order to enhance the sealing performance, edge portions of each glass sheet can be processed into an appropriate shape. For example, edge portions of at least one of the glass sheets may be processed by C-chamfering (the glass sheet has a trapezoidal cross-sectional shape) or R-chamfering (the glass sheet has an approximately arc cross-sectional shape), thereby increasing the area of contact between the seal member and the glass. Thus, the strength of adhesion between the seal member and the glass can be enhanced.

(Diaphragm, Opening Member)

The present invention relates to: a diaphragm including the glass sheet composite and a vibrator; and an opening member including the glass sheet composite.

The diaphragm can be made to function as a loudspeaker, a microphone, an earphone, or a casing's vibrating body or casing's speaker of a mobile device, etc. by disposing, for example, one or more vibration elements or vibration detection elements (vibrators) on one side or both sides of the glass sheet composite. In order to enhance the output sound pressure level, two or more vibration elements are preferably disposed on both sides of the glass sheet composite. In general, the position of the vibrators with respect to the diaphragm is preferably the central portion of the composite, but since the material has a high acoustic velocity and a high damping performance, the vibrator may be disposed at an edge part of the glass sheet composite. Use of the diaphragm according to the present invention can facilitate reproduction of the sound in a high-frequency region, of which reproduction had been conventionally difficult. In addition, the degree of freedom in the size, shape, color, etc. of the glass sheet composite is high, and a design can be applied, so that a diaphragm with excellent designability can be obtained. Furthermore, by sampling sound or vibration by a sound collecting microphone or a vibration detector disposed on the surface or in the vicinity of the glass sheet composite and generating vibration of the same phase or reverse phase in the glass sheet composite, the sound or vibration sampled can be amplified or canceled. At this time, in the case where the sound or vibration characteristics at the sampling point above are caused to undergo a change based on a certain acoustic transfer function in the course of propagating to the glass sheet composite and an acoustic conversion transfer function is present in the glass sheet composite, the vibration can be accurately amplified or canceled by correcting the amplitude and phase of the control signal by means of a control filter. At the time of constructing the control filter above, for example, the least-square (LMS) algorithm can be used.

As a more specific configuration, for example, the glass sheet composite of the present invention can be used for all or at least one glass sheet of a double glass to provide a structure where the vibration level of the sheet at the inflow side of a sonic vibration is to be controlled or the sound pressure level of a space present between glasses is sampled and after appropriate signal correction by a control filter, output to a vibration element on the glass sheet composite disposed at the outflow side of the sonic vibration.

This diaphragm can be utilized, for example, as a member for electronic devices, in a full-range loudspeaker, a loudspeaker for reproducing a low-pitched sound range of 15 Hz to 200 Hz, a loudspeaker for reproducing a high-pitched sound range of 10 kHz to 100 kHz, a large loudspeaker having a diaphragm area of 0.2 $m^2$ or more, a small loudspeaker having a diaphragm area of 3 $cm^2$ or less, a flat loudspeaker, a cylindrical loudspeaker, a transparent loudspeaker, a mobile device cover glass functioning as a loudspeaker, a TV display cover glass, a display outputting video signals and audio signals from the same surface, a loudspeaker for wearable displays, an electronic display device, and lighting equipment. In addition, the diaphragm can be used as a diaphragm or vibration sensor for headphones, earphones or microphones.

This diaphragm can be used as an interior vibration member of transport machinery such as vehicle, or as an in-vehicle/in-device loudspeaker and can form, for example, a side-view mirror, a sun visor, an instrument panel, a dashboard, a ceiling, a door, or other interior panels, each functioning as a loudspeaker. In addition, such a member can also be made to function as a microphone and a diaphragm for active noise control.

With respect to other uses, the diaphragm can be used as a diaphragm for ultrasonic generators, a slider for ultrasonic motors, a low frequency generator, a vibrator for propagating sonic vibration in liquid, a water tank and a container each using the vibrator, a vibration element, a vibration detection element, and an actuator material for vibration damping equipment.

The opening member includes, for example, an opening member used for buildings, transport machinery, etc. For example, in the case of using a glass sheet composite less likely to resonate in the frequency band of noise generated from the drive part, etc. of vehicles, airplanes, ships, power generators, etc., an excellent effect of inhibiting generation of particularly such noise can be obtained. In addition, a function such as IR cut, UV cut and coloration can be imparted to the glass sheet composite.

At the time of application as an opening member, a diaphragm in which one or more vibration elements or vibration detection elements (vibrators) are disposed on one side or both sides of the glass sheet composite can be made to function as a loudspeaker or a microphone. Use of the glass sheet composite according to the present invention can facilitate reproduction of the sound in a high-frequency region, of which reproduction had been conventionally difficult. In addition, the degree of freedom in the size, shape, color, etc. of the glass sheet composite is high, and a design can be applied, so that an opening member also having excellent designability can be obtained. Furthermore, by sampling sound or vibration by a sound collecting microphone or a vibration detector disposed on the surface or in the vicinity of the glass sheet composite and generating vibration of the same phase or reverse phase in the glass sheet composite, the sound or vibration sampled can be amplified or canceled.

More specifically, the member can be used as an in-vehicle loudspeaker, an outside-the-vehicle loudspeaker, and a windshield, side glass, rear glass, or roof glass having a sound insulating function. At this time, the structure may be configured to be capable of transmitting or blocking only a specific sonic vibration. It can also be used as a vehicle window, structural member, or decorative plate that has improved water-repellency, snow accretion resistance, ice accretion resistance or antifouling property due to sonic vibration. Specifically, the member can be used as an automotive window glass, mirror, lens or sensor, and a cover glass thereof.

The opening member for buildings can be used as window glass, door glass, roof glass, an interior material, an exterior material, a decorative material, a structural material, an outer wall, a sound insulating board, a sound insulating wall, and a solar cell cover glass, each functioning as a diaphragm and a vibration detecting device. They can also be made to function as a sound reflecting (reverberation) plate. Furthermore, the above-described water repellency, snow accretion resistance and antifouling property can be enhanced by the sonic vibration.

(Method for producing the Glass Sheet Composite)

The glass sheet composite according to the present invention can be obtained by forming a liquid layer between a pair of glass sheets.

Methods for forming the liquid layer between a pair of glass sheets are not particularly limited, and examples thereof include: a method in which a liquid layer is formed on a surface of a glass sheet and another glass sheet is disposed thereon; a method in which glass sheets each having a liquid layer formed on a surface thereof are put together; and a method in which a liquid layer is poured into the gap between two glass sheets.

Methods for forming the liquid layers are also not particularly limited. For example, a liquid for constituting a liquid layer can be applied to a glass sheet surface by a technique such as dispenser, spin coating, die coating, screen printing, or ink-jet printing.

(Embodiments of the Glass Sheet Composite)

Figure 1B:
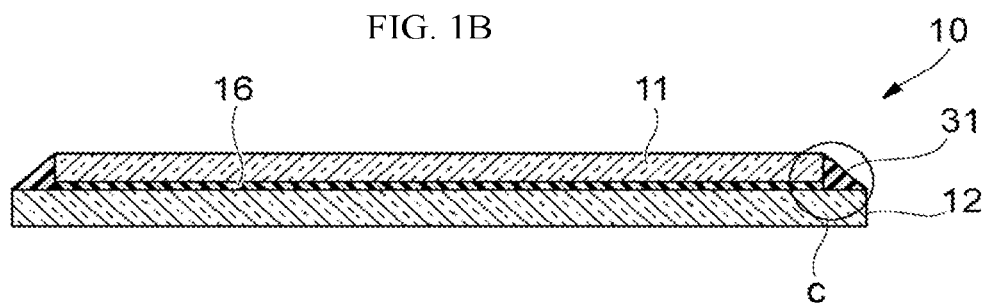
FIG. 1B is a cross-sectional view along line I-I in FIG. 1A.
Figure 1C:
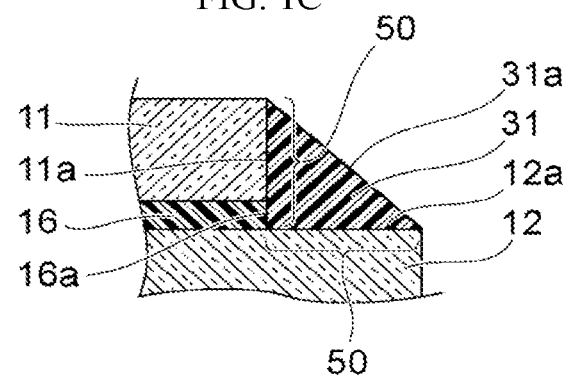
FIG. 1C is an enlarged view of the portion C in FIG. 1B.

FIGS. 1A to 1C show a glass sheet composite 10 according to a first embodiment of the present invention. FIG. 1A is a plan view of the glass sheet composite according to a first embodiment, FIG. 1B is a cross-sectional view along line I-I in FIG. 1A, and FIG. 1C is an enlarged view of the portion C in FIG. 1B.

The glass sheet composite 10 includes: a first sheet (one sheet or the other sheet) 11 and a second sheet (the other sheet or one sheet) 12 as at least two sheets; and a liquid layer 16 held between the first sheet 11 and the second sheet 12. At least one of the two sheets, i.e., the first sheet 11 and the second sheet 12, is constituted of a glass sheet.

As FIG. 1B and FIG. 1C show, the two sheets, i.e., the first sheet 11 and the second sheet 12, have been disposed so that an edge surface of one of these and an edge surface of the other are not flush with each other to thereby constitute a step portion 50 having a stair-like shape in a cross-sectional view. A seal material 31 has been provided to the step portion 50 to seal up at least the liquid layer 16.

In the step portion 50, the seal material 31 adheres to an edge surface 11a of the first sheet 11, an edge surface 16a of the liquid layer 16, and a main surface 12a of the second sheet 12. Due to this configuration, not only the liquid layer 16 is sealed up by the seal material 31 and thus prevented from leaking out but also the integration of the first sheet 11, liquid layer 16, and second sheet 12 is enhanced to heighten the strength of the glass sheet composite 10.

The step portion 50 in this embodiment has been configured so that the edge surface 11a of the first sheet 11 and the edge surface 16a of the liquid layer 16 are perpendicular to the main surface 12a of the second sheet 12. As a result, the seal material 31, in a cross-sectional view, has an L-shaped contour extending along the step portion 50. Due to this configuration, the integration of the first sheet 11, liquid layer 16, and second sheet 12 is further enhanced to further heighten the strength of the glass sheet composite 10.

Furthermore, in this embodiment, the seal material 31 has a taper surface 31a. Although there are cases where edges of the glass sheet composite 10 are subjected to tapering or the like, the disposition of the seal material 31 having such a shape can produce the same effect as the processing of the glass sheet composite.

Figure 2:
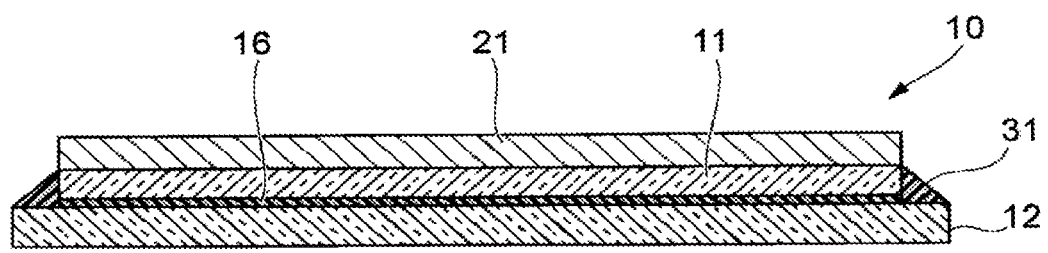
FIG. 2 is a cross-sectional view illustrating another example of the glass sheet composite of the present invention.

FIG. 2 is a cross-sectional view showing another example of the glass sheet composite 10. The glass sheet composite 10 of FIG. 2 is the glass sheet composite 10 of FIG. 1 which has a cover layer 21, e.g., a coating or a film, formed on an outermost surface thereof. Various functions can be imparted by the cover layer 21.

Figure 3:
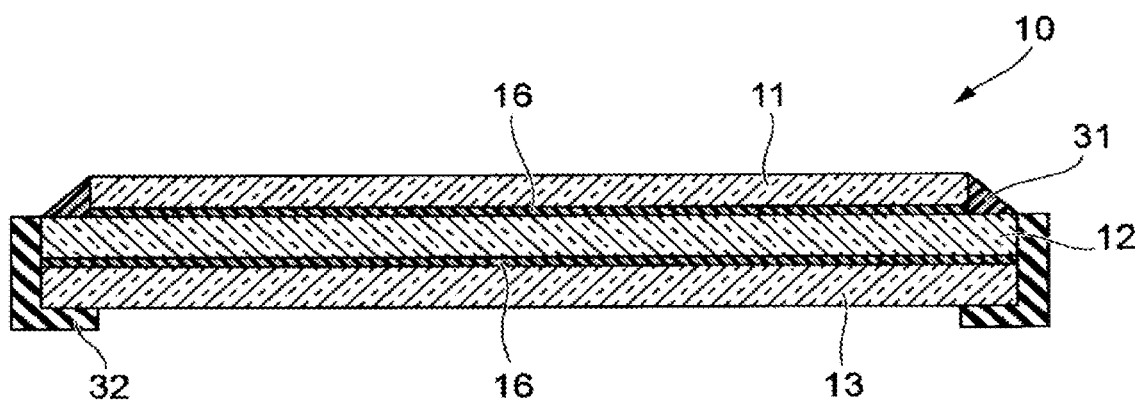
FIG. 3 is a cross-sectional view illustrating still another example of the glass sheet composite of the present invention.

FIG. 3 is a cross-sectional view showing still another example of the glass sheet composite 10. The glass sheet composite 10 of FIG. 3 includes the configuration of the glass sheet composite 10 of FIG. 1 and another glass sheet 13. This configuration can enhance the strength of the glass sheet composite 10. A seal member 32 has been provided to edge portions of the glass sheet composite 10 to seal up a liquid layer 16. A seal tape 40 (see FIG. 7) may be applied in place of the seal member 32.

Figure 4:
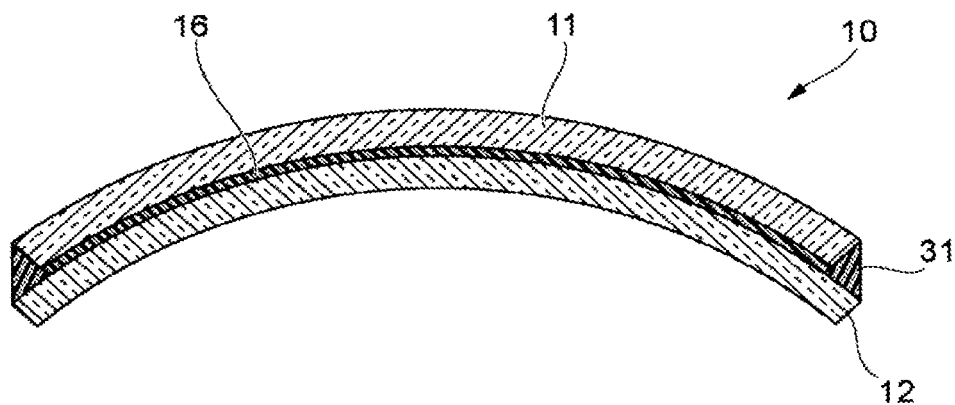
FIG. 4 is a cross-sectional view illustrating a further example of the glass sheet composite of the present invention.

FIG. 4 is a cross-sectional view showing a further example of the glass sheet composite 10. The glass sheet composite 10 of FIG. 4 is the glass sheet composite 10 of FIG. 1 which has been processed into a curved surface shape. Such a shape can enhance the degree of freedom of designing various devices (diaphragms, opening members, etc.) in which the glass sheet composite is utilized.

Figure 5:
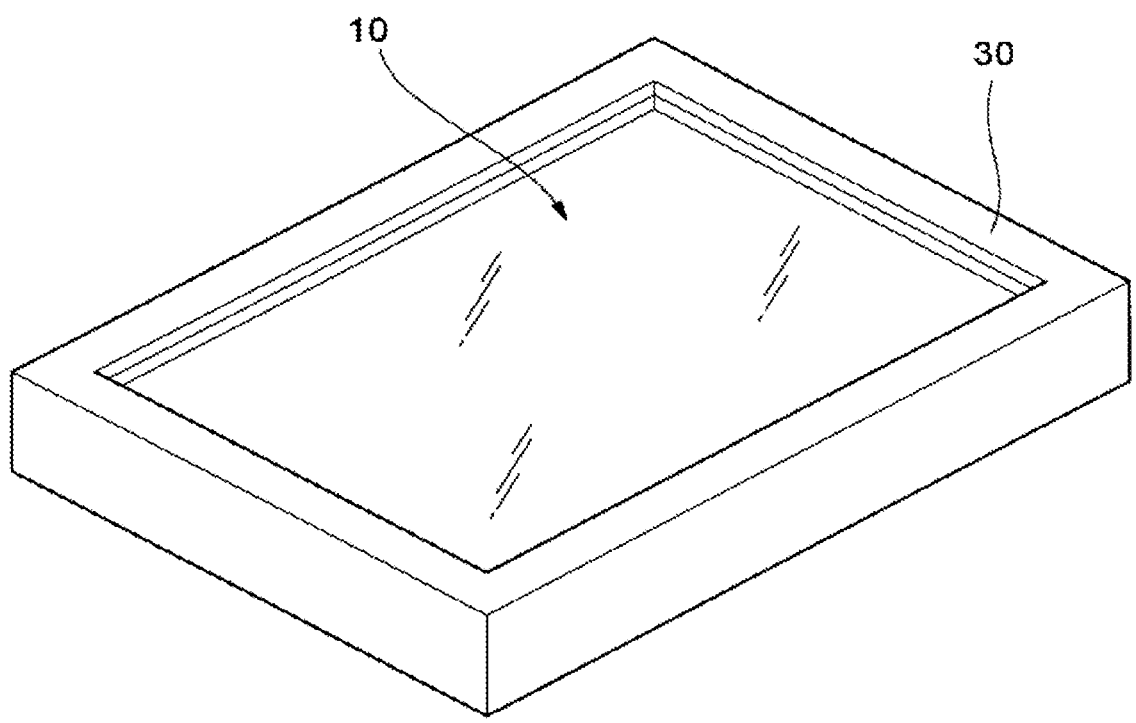
FIG. 5 is a slant view illustrating still a further example of the glass sheet composite of the present invention.
Figure 6A:
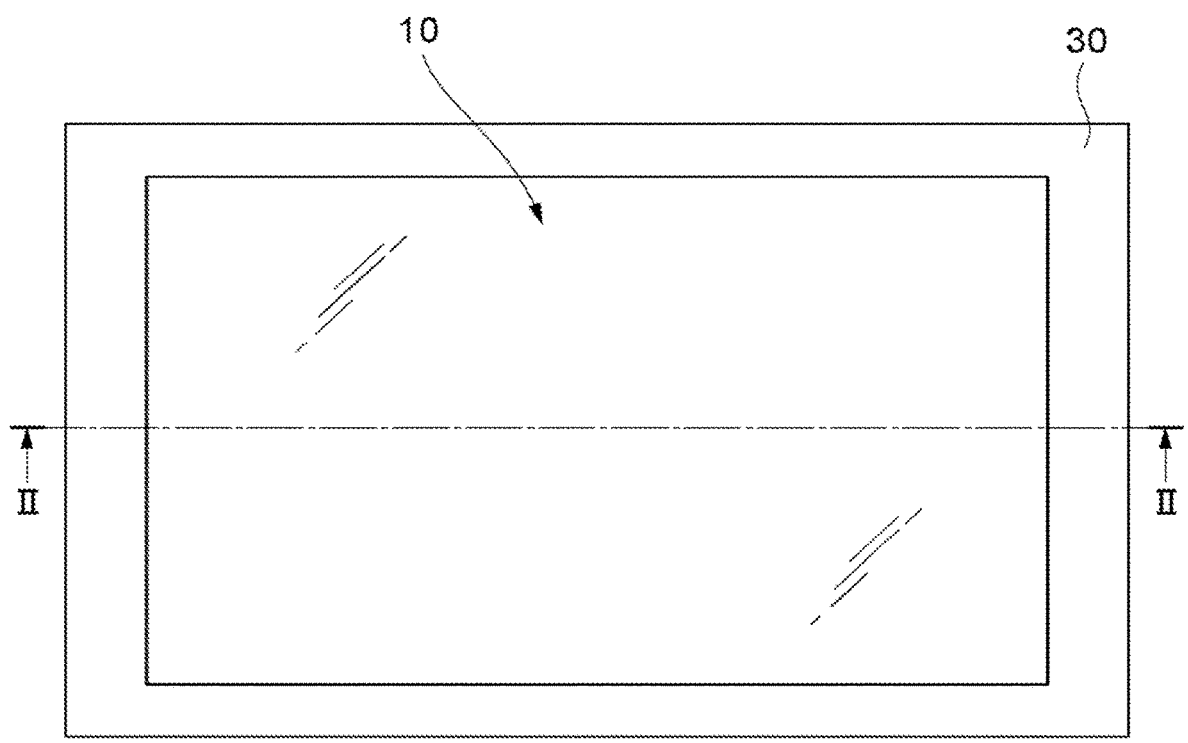
FIG. 6A is a plan view of the example shown in FIG. 5.
Figure 6B:
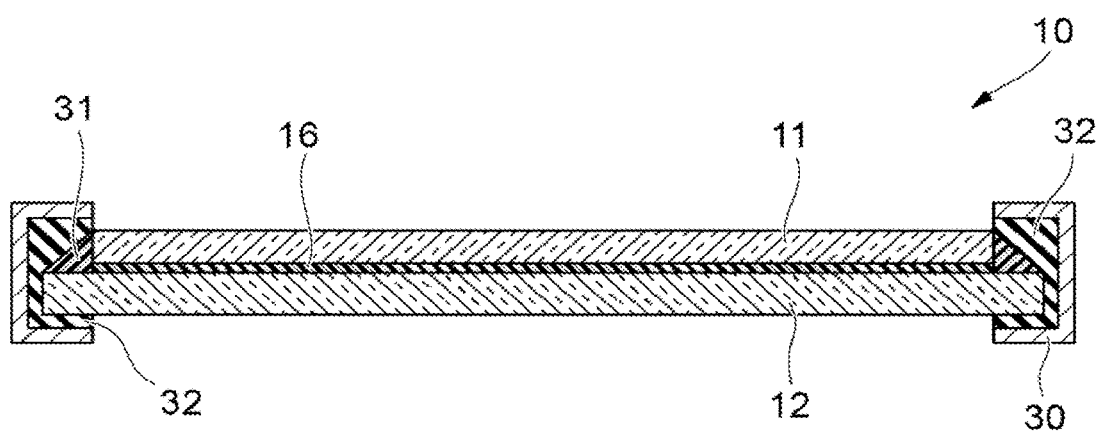
FIG. 6B is a cross-sectional view along line II-II in FIG. 6A.

FIG. 5 and FIG. 6 show still a further example of the glass sheet composite 10. FIG. 5 is a slant view of the example, FIG. 6A is a plan view of the example of FIG. 5, and FIG. 6B is a cross-sectional view along line II-II in FIG. 6A. In this example, a frame 30 has been provided to the outer edges of the glass sheet composite 10, at least to an outermost surface of the glass sheet composite 10. Due to the frame 30, the rigidity of the glass sheet composite 10 is further improved. In cases when the frame 30 is applied to the glass sheet composite 10 of FIG. 4, the curved surface shape can be more reliably maintained. Furthermore, a seal member 32 has been disposed between the glass sheet composite 10 and the frame 30. This seal member 32 has stretchability, making it possible to easily attach the frame 30 to the glass sheet composite 10.

Figure 7A:
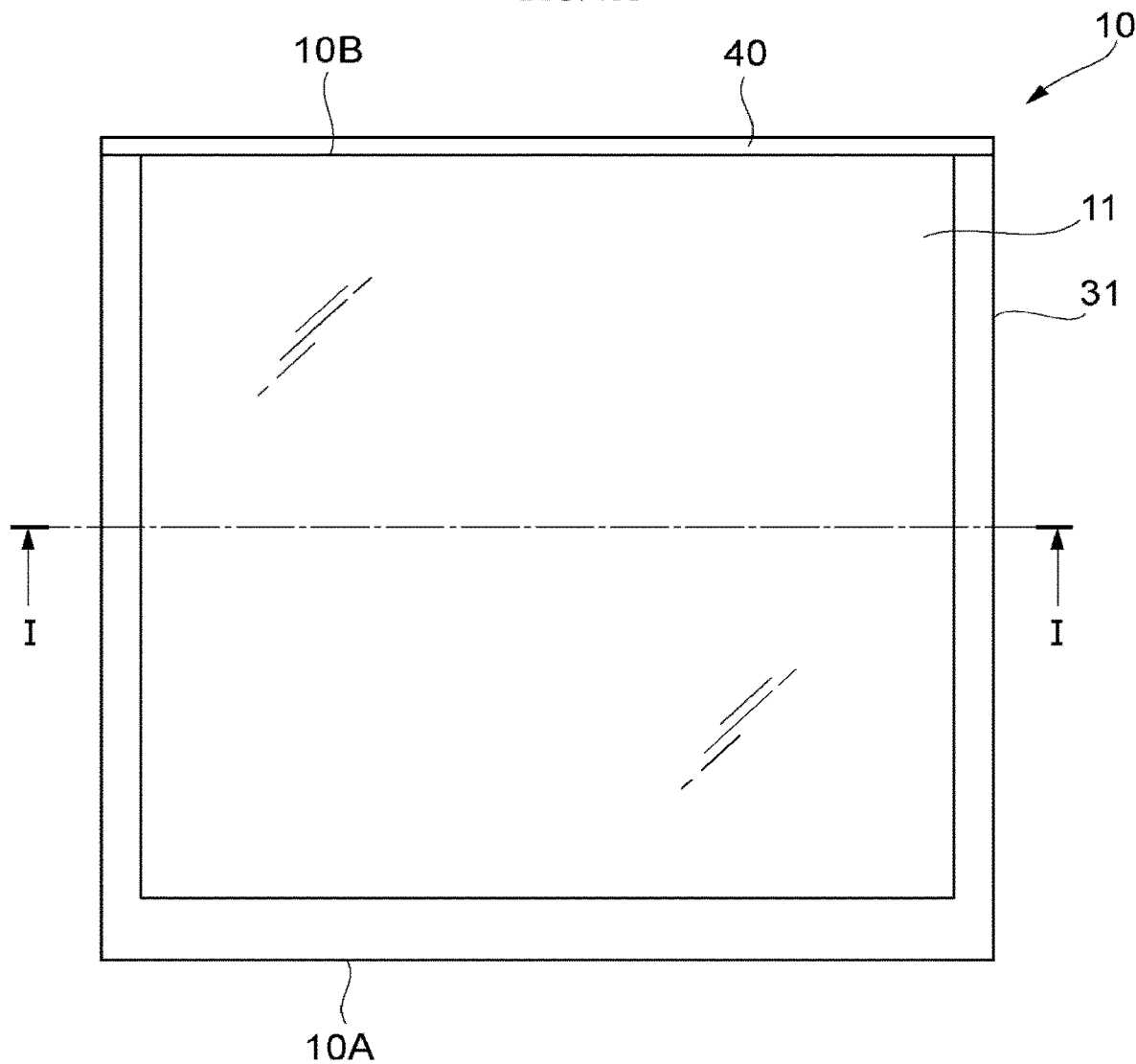
FIG. 7A is a plan view of a glass sheet composite according to a second embodiment of the present invention.
Figure 7B:
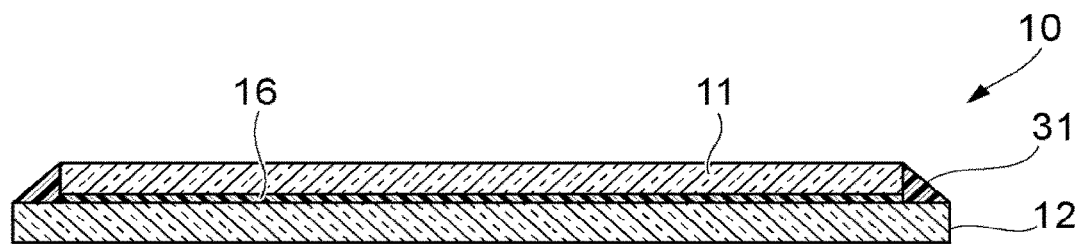
FIG. 7B is a cross-sectional view along line I-I in FIG. 7A.

FIGS. 7A and 7B show a glass sheet composite 10 according to a second embodiment of the present invention. FIG. 7A is a plan view of the glass sheet composite according to the second embodiment of the present invention, and FIG. 7B is a cross-sectional view along line I-I in FIG. 7A. In the embodiment shown in FIG. 1, the first sheet 11 is slightly smaller than the second sheet 12, so that the glass sheet composite 10, which is rectangular (square or rectangular) in a plan view, has a step portion 50 formed on all the four edges, i.e., throughout the whole circumference of the glass sheet composite 10. Consequently, the seal material 31 has been disposed throughout the whole circumference of the glass sheet composite 10. Meanwhile, in the second embodiment shown in FIG. 7, a step portion 50 has been formed on three edges of the glass sheet composite 10, which is rectangular in a plan view, and a seal material 31 has been disposed on the three edges. The seal material 31 has a larger width in one edge 10A out of the three edges. On the edge 10B having no step portion 50, a seal tape 40 has been applied to seal up the liquid layer 16. In place of the seal tape 40, a seal member 32 may be disposed.

Figure 8A:
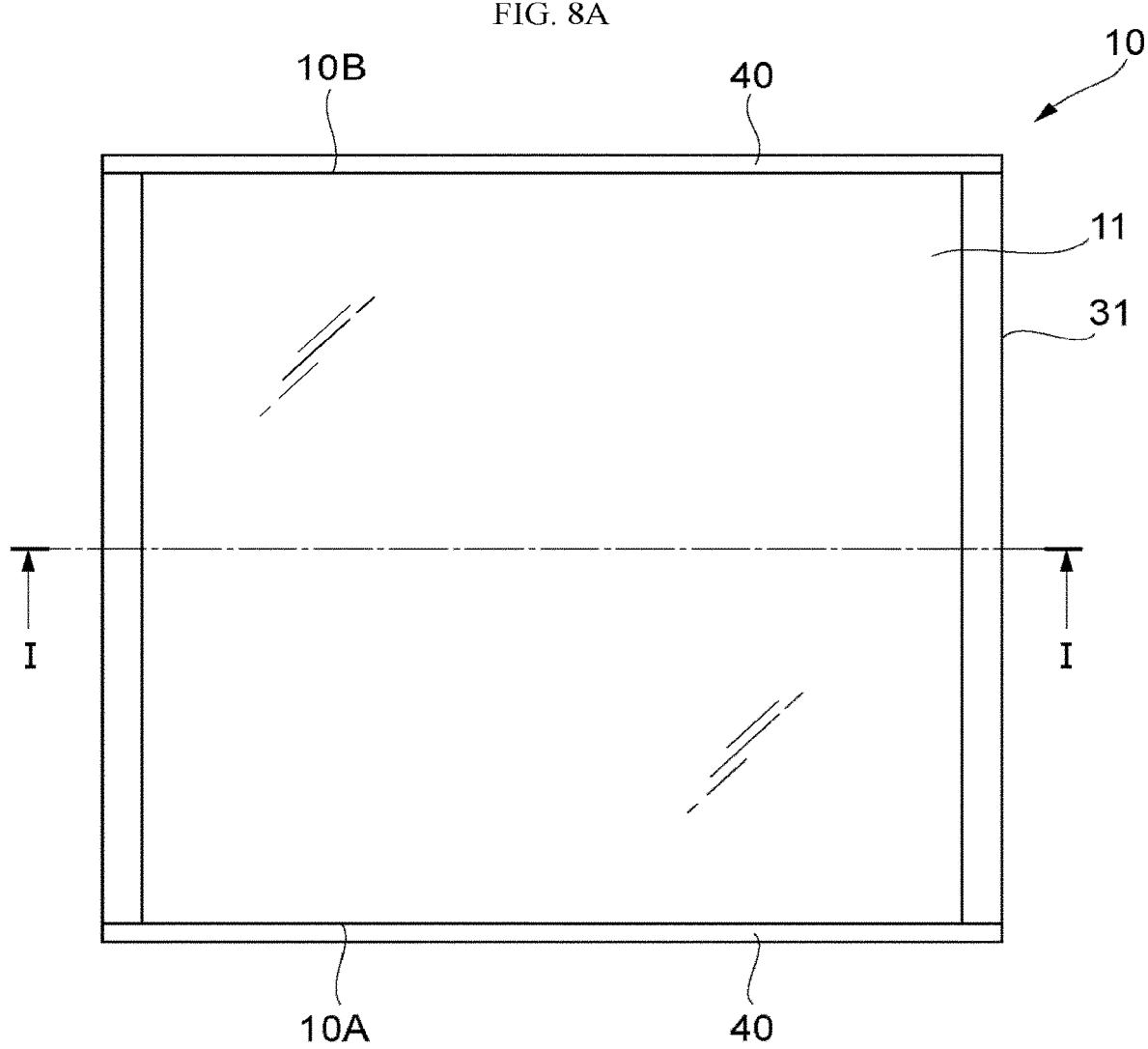
FIG. 8A is a plan view of a glass sheet composite according to a third embodiment of the present invention.
Figure 8B:
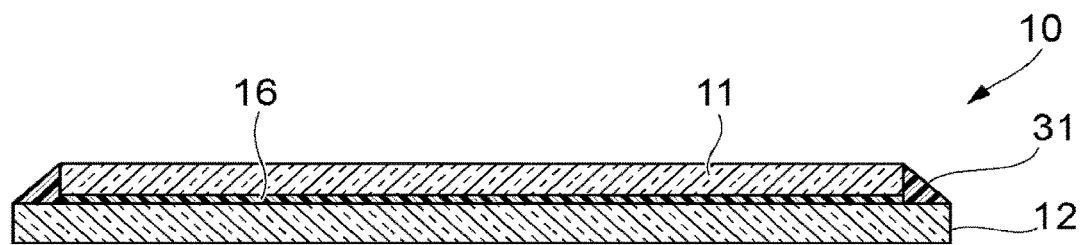
FIG. 8B is a cross-sectional view along line I-I in FIG. 8A.

FIGS. 8A and 8B show a glass sheet composite 10 according to a third embodiment of the present invention. FIG. 8A is a plan view of the glass sheet composite according to the third embodiment of the present invention, and FIG. 8B is a cross-sectional view along line I-I in FIG. 8A. In the third embodiment shown in FIG. 8, a step portion 50 has been formed on two edges of the glass sheet composite 10, which is rectangular in a plan view, and a seal material 31 has been disposed on the two edges. The amount of the seal material 31 in this embodiment can be reduced as compared with the first and second embodiments. On the two edges 10A and 10B having no step portion 50, a seal tape 40 has been applied to seal up the liquid layer 16. In place of the seal tape 40, a seal member 32 may be disposed.

Figure 9A:
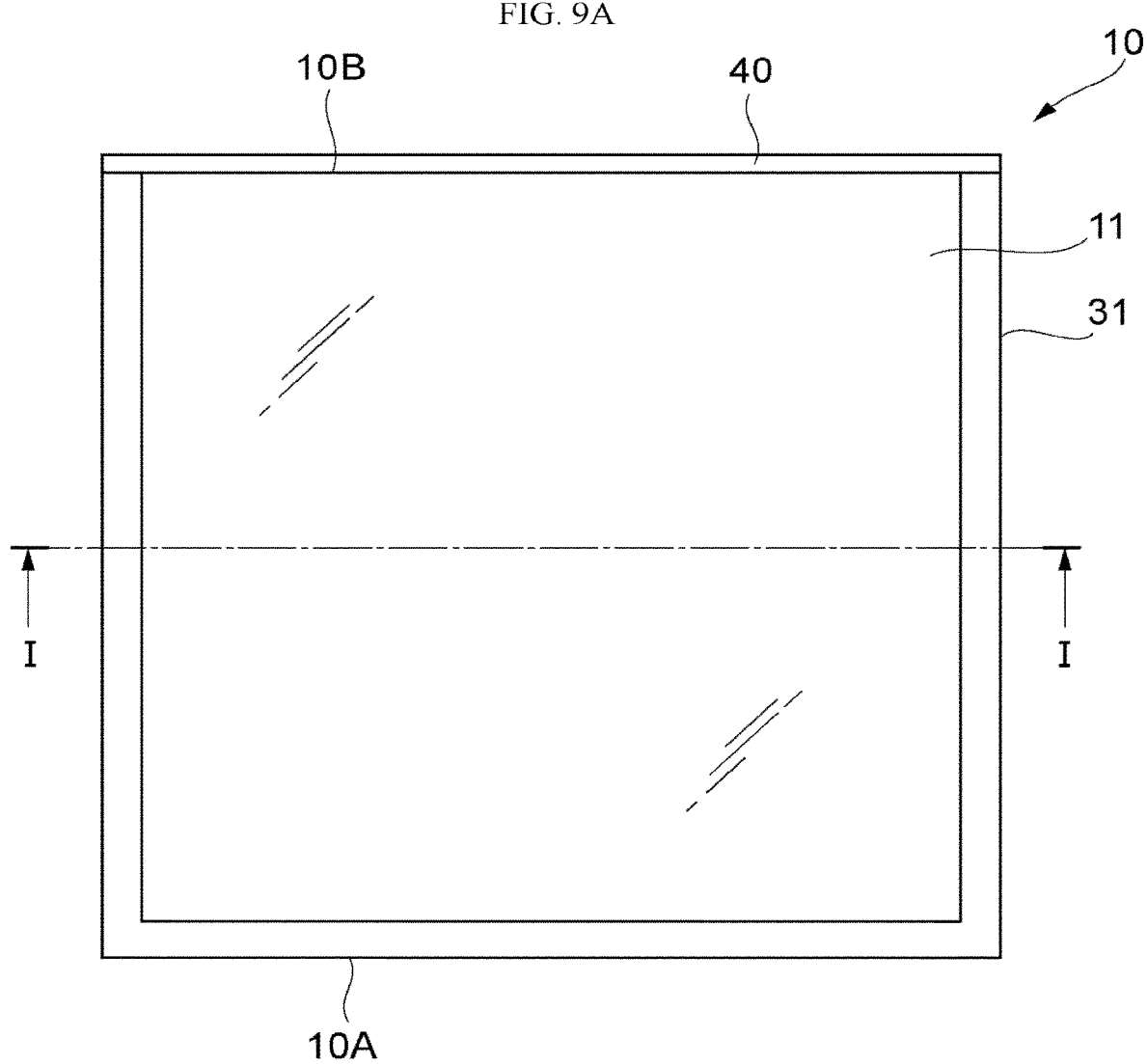
FIG. 9A is a plan view of a glass sheet composite according to a fourth embodiment of the present invention.
Figure 9B:
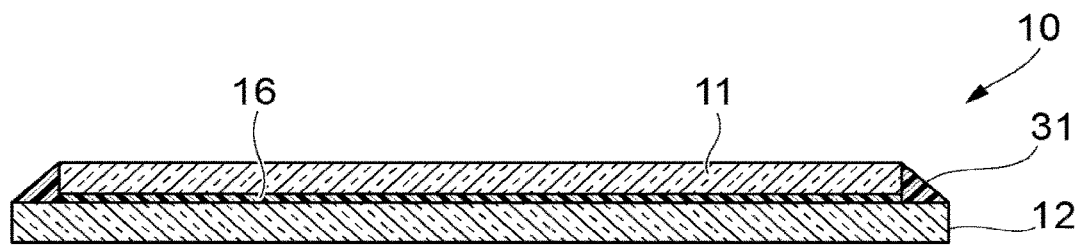
FIG. 9B is a cross-sectional view along line I-I in FIG. 9A.

FIGS. 9A and 9B show a glass sheet composite 10 according to a fourth embodiment of the present invention. FIG. 9A is a plan view of the glass sheet composite according to the fourth embodiment of the present invention, and FIG. 9B is a cross-sectional view along line I-I in FIG. 9A. This embodiment is similar to the second embodiment shown in FIG. 7. However, the width of the seal material 31 in one edge 10A out of the three edges is not larger and is approximately the same as those in the other edges. On the edge 10B having no step portion 50, a seal tape 40 has been applied to seal up the liquid layer 16. In place of the seal tape 40, a seal member 32 may be disposed.

Figure 10A:
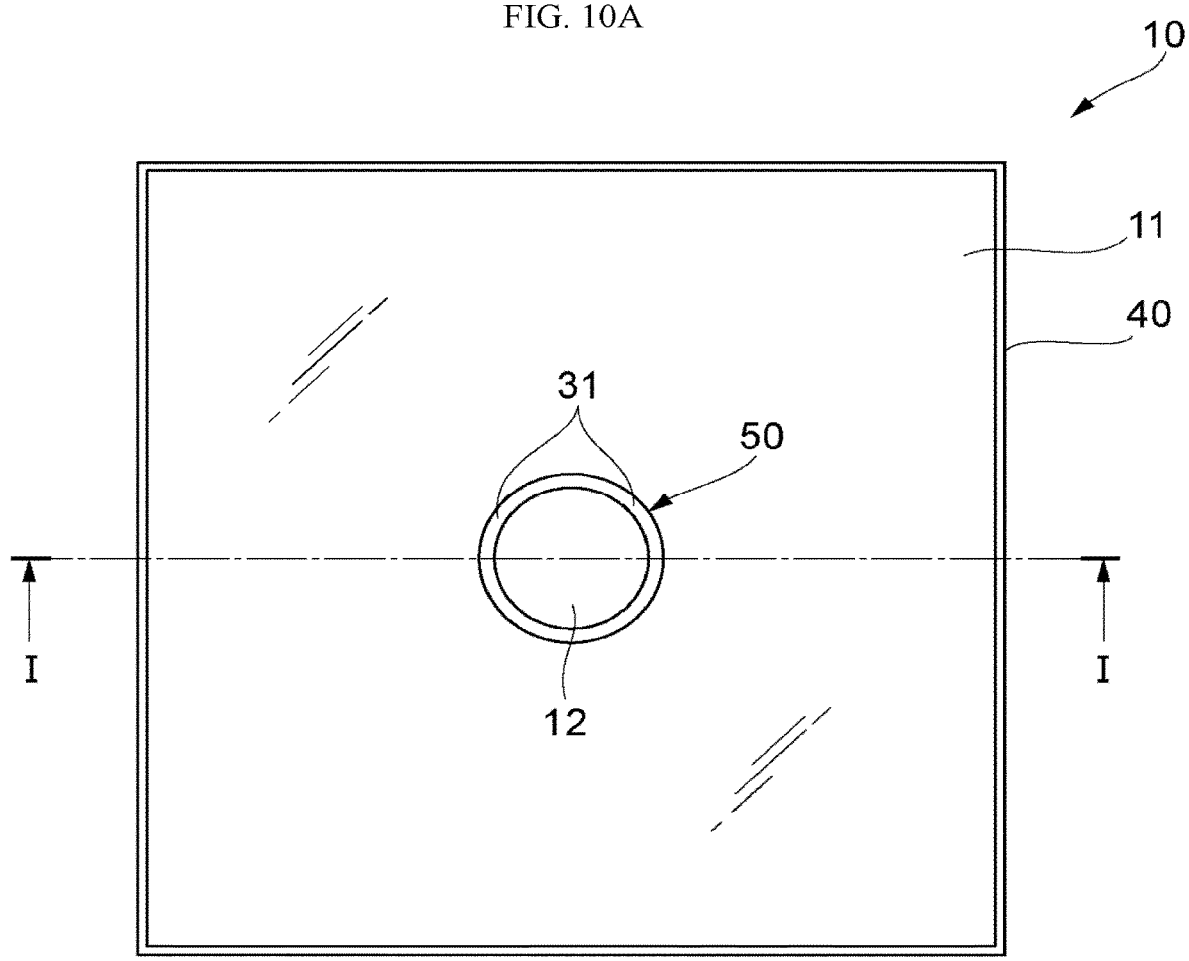
FIG. 10A is a plan view of a glass sheet composite according to a fifth embodiment of the present invention.
Figure 10B:
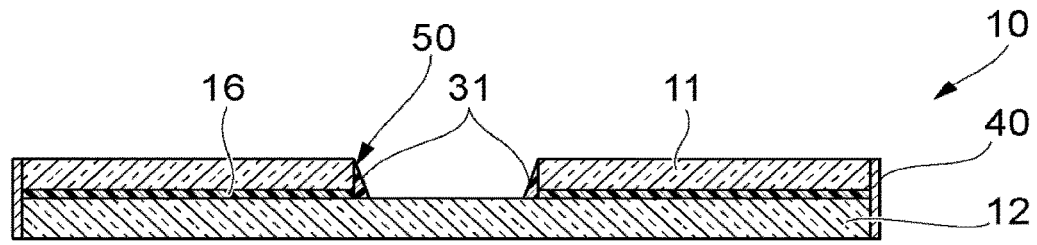
FIG. 10B is a cross-sectional view along line I-I in FIG. 10A.

FIGS. 10A and 10B show a glass sheet composite 10 according to a fifth embodiment of the present invention. FIG. 10A is a plan view of the glass sheet composite according to the fifth embodiment of the present invention, and FIG. 10B is a cross-sectional view along line I-I in FIG. 10A. This embodiment differs from the other embodiments in that this embodiment includes a step portion 50 and a seal material 31 which have been disposed not on the circumference of the glass sheet composite 10 but in approximately the center of the glass sheet composite 10 in a plan view. This configuration also satisfies the requirement that two sheets (a first sheet 11 and a second sheet 12) have been disposed so that an edge surface of one of the two sheets and an edge surface of the other sheet are not flush with each other. This configuration enhances the strength of the glass sheet composite 10. A seal tape 40 has been applied to the circumferential edge surfaces of the glass sheet composite 10 to seal up the liquid layer 16.

Figure 11A:
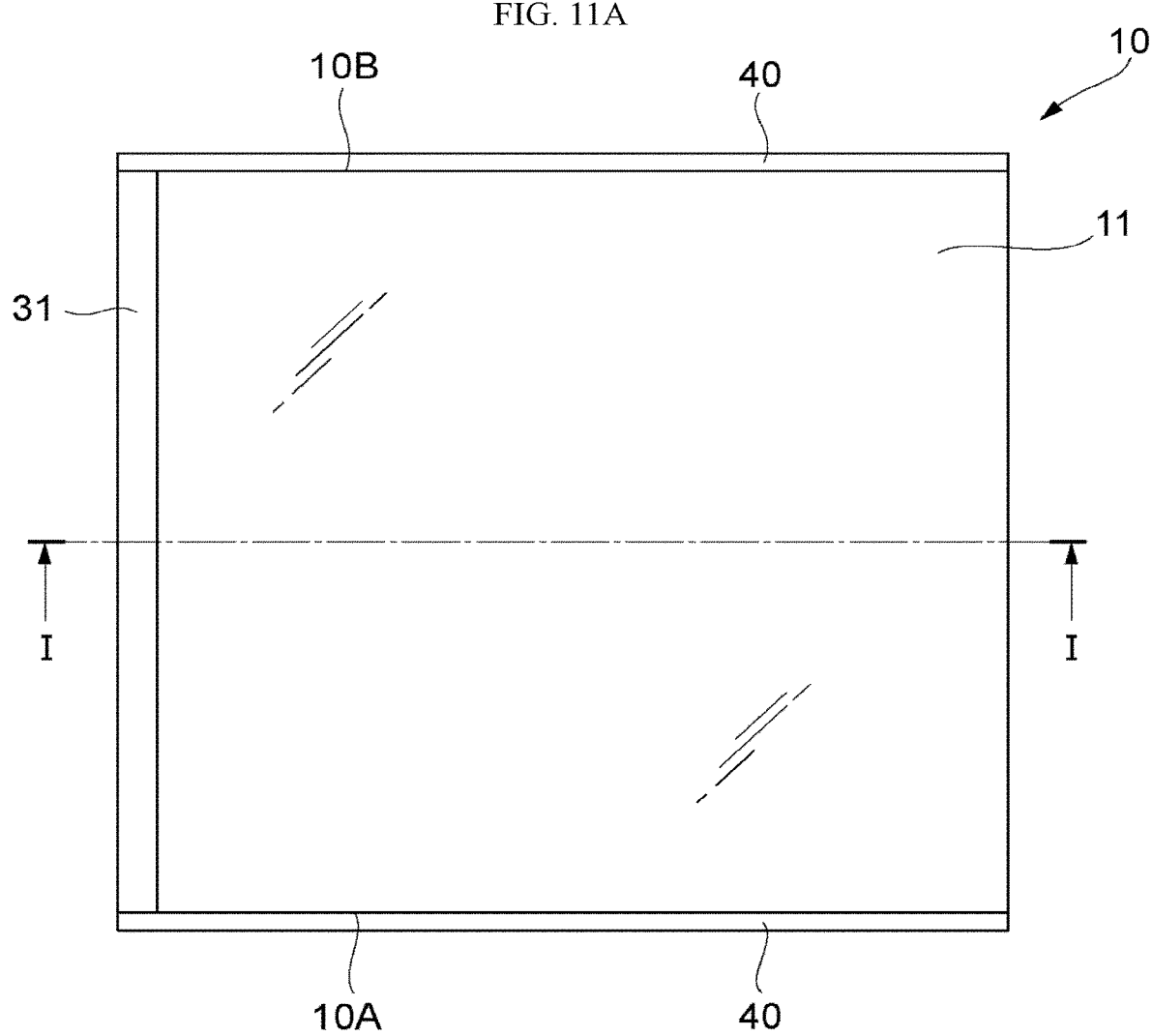
FIG. 11A is a plan view of a glass sheet composite according to a sixth embodiment of the present invention.
Figure 11B:
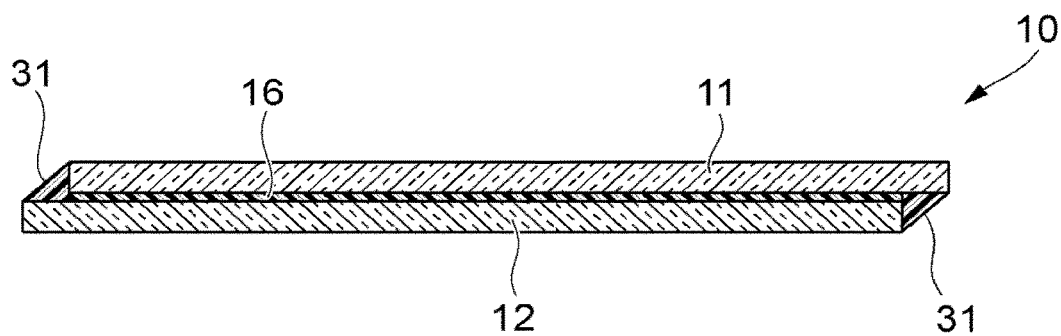
FIG. 11B is a cross-sectional view along line I-I in FIG. 11A.

FIGS. 11A and 11B shows a glass sheet composite 10 according to a sixth embodiment of the present invention. FIG. 11A is a plan view of the glass sheet composite according to the sixth embodiment of the present invention, and FIG. 11B is a cross-sectional view along line I-I in FIG. 11A. This embodiment differs from the other embodiments in that a seal material 31 has been disposed on opposed two edges of the glass sheet composite 10 and on opposite surfaces thereof. In this configuration also, the glass sheet composite 10 can have improved strength. On the two edges 10A and 10B having no step portion 50, a seal tape 40 has been applied to seal up the liquid layer 16. In place of the seal tape 40, a seal member 32 may be disposed.

Figure 12A:
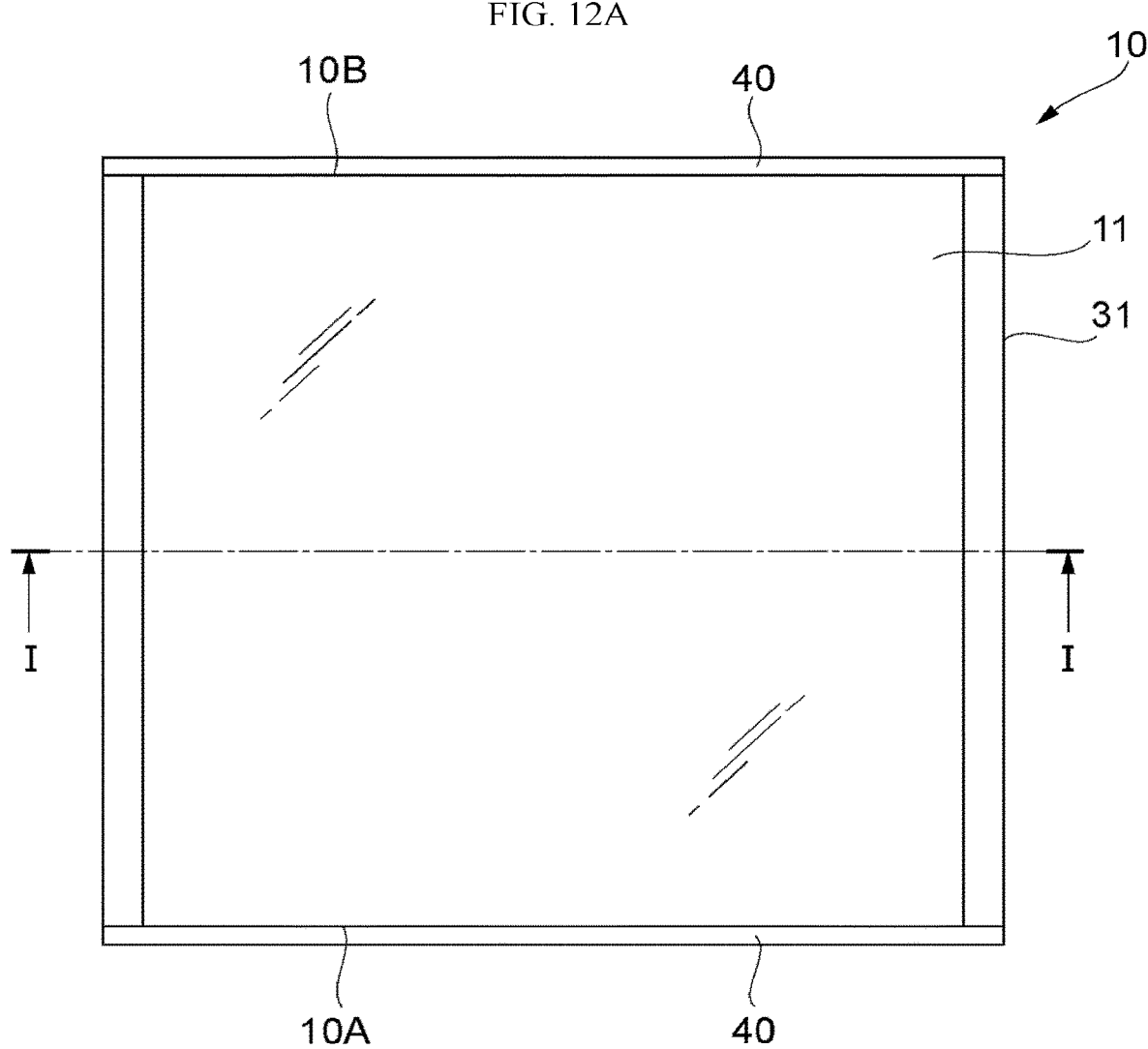
FIG. 12A is a plan view of a glass sheet composite according to a seventh embodiment of the present invention.
Figure 12B:
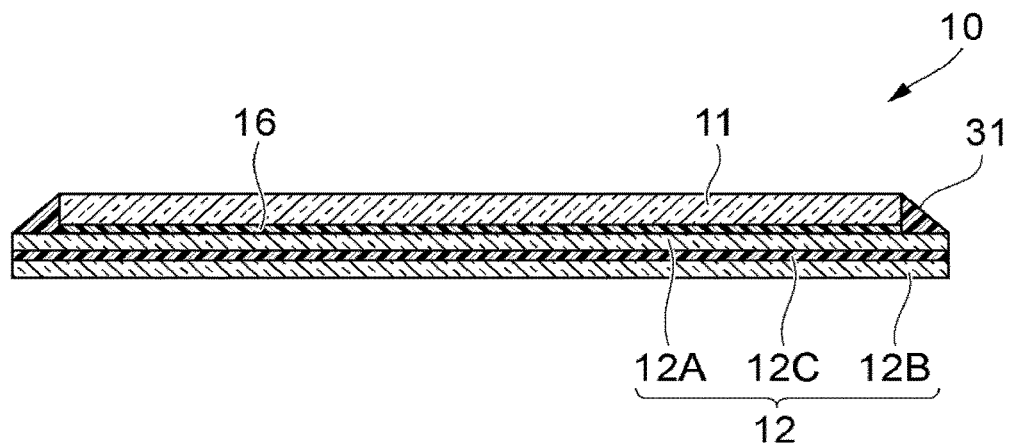
FIG. 12B is a cross-sectional view along line I-I in FIG. 12A.

FIGS. 12A and 12B show a glass sheet composite 10 according to a seventh embodiment of the present invention. FIG. 12A is a plan view of the glass sheet composite according to the seventh embodiment of the present invention, and FIG. 12B is a cross-sectional view along line I-I in FIG. 12A. This embodiment includes a second sheet 12, which is a glass sheet but is constituted of a laminated glass. Usually, the term "laminated glass" means a laminate of a plurality of glass sheets. In the present invention, however, the laminated glass is handled as an integrated sheet. It is, however, noted that "the glass sheet composite" itself "which includes at least two sheets and a liquid layer held between the two sheets and in which at least one of the two sheets is a glass sheet" is not included in the laminated glass in the present invention. The laminated glass is composed of a first glass 12A, a second glass 12B, and an interlayer 12C made of a resin or the like and sandwiched between the glasses 12A and 12B. In this configuration also, the glass sheet composite 10 can have improved strength. On the two edges 10A and 10B having no step portion 50, a seal tape 40 has been applied to seal up the liquid layer 16. In place of the seal tape 40, a seal member 32 may be disposed.

Figure 13A:
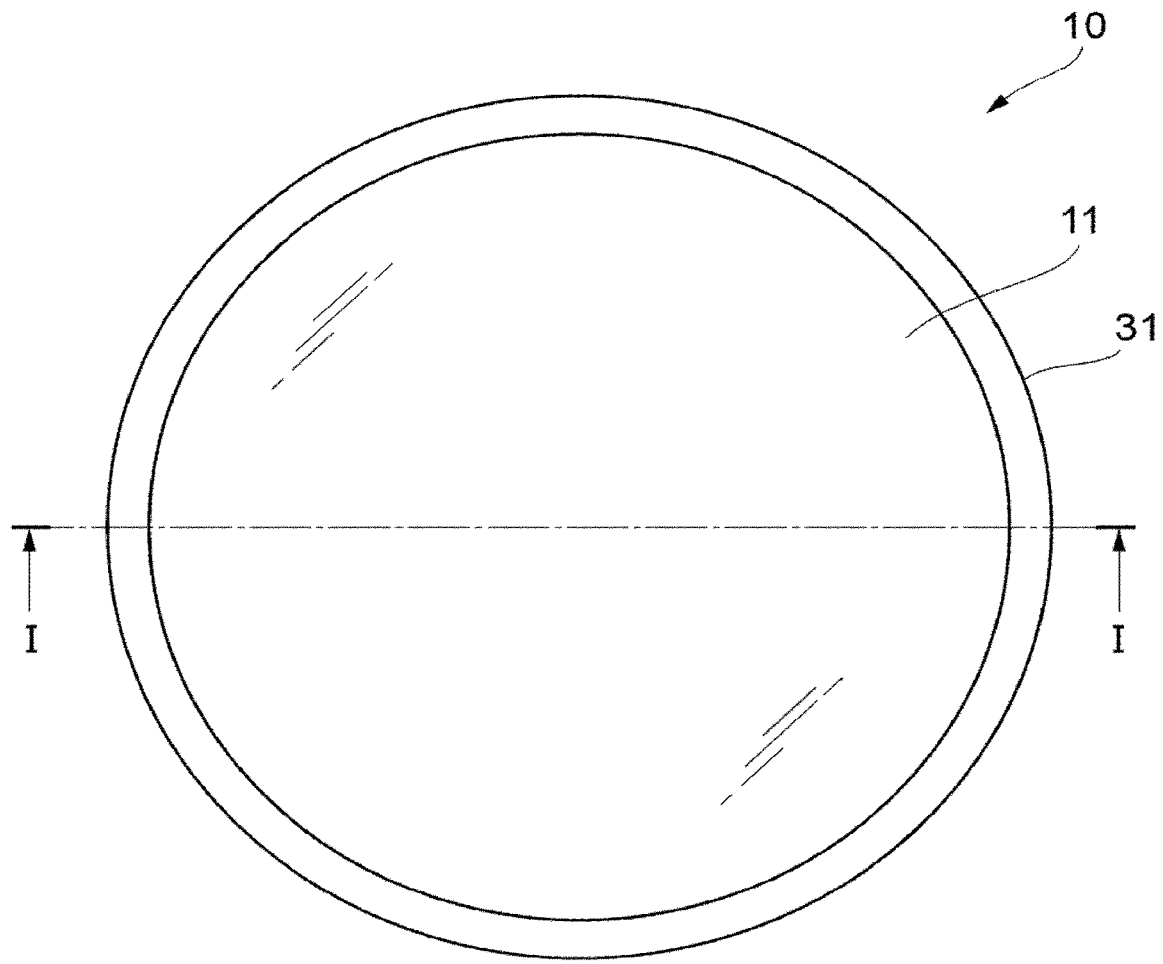
FIG. 13A is a plan view of a glass sheet composite according to an eighth embodiment of the present invention.
Figure 13B:
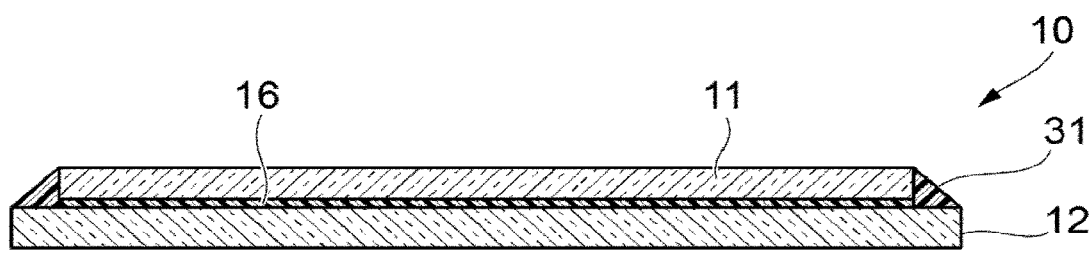
FIG. 13B is a cross-sectional view along line I-I in FIG. 13A.

FIGS. 13A and 13B show a glass sheet composite 10 according to an eighth embodiment of the present invention. FIG. 13A is a plan view of the glass sheet composite according to an eighth embodiment of the present invention, and FIG. 13B is a cross-sectional view along line I-I in FIG. 13A. In this embodiment, the glass sheet composite 10 has not a rectangular (square or rectangular) plan-view shape as in the other embodiments but a circular plan-view shape. The remainder of the configuration is the same as in other embodiments.

Each of the embodiments described above is not limited in the size thereof. It is possible to configure a large glass sheet composite having a circumferential length of, for example, 1 m or larger.

The step portion 50 can be regarded as a non-overlap portion where either of the two sheets (the first sheet 11 and the second sheet 12) does not overlie the other. It is desirable that the proportion of the area of this non-overlap portion in a plan view is set at 0.1-20% of the area of the overlap portion, where either of the two sheets overlies the other. Proportions thereof less than 0.1% may result in an insufficient area for sealing up, while proportions thereof larger than 20% may result in a decrease in resonance-inhibiting effect.

Although the glass sheet composite of the present invention is configured by stacking two sheets (a first sheet 11 and a second sheet 12) having a given relationship therebetween, the given relationship can be any of various relationships so long as a step portion can be formed. Representative examples employ two sheets differing in outer circumferential size, such as, for example, the embodiment shown in FIG. 1. However, a step portion can be formed even with two sheets which are equal in outer circumferential size but differ in shape, as in the embodiment shown in FIG. 10. Furthermore, even with two sheets which are equal in outer circumferential size and shape, a step portion can be formed by disposing the sheets so that the sheets are offset from each other, as in the embodiment shown in FIG. 11.

In case where there is no step portion, it may be conceived of disposing a seal material on the circumference or edge surfaces of the two sheets. However, this configuration necessitates a contrivance for ensuring strength, for example, increasing the width or thickness of the seal material or heightening the hardness of the seal material. Such a contrivance, however, enhances the mutual constriction of the two sheets, and this is apt to result in a decrease in loss coefficient and induce resonance vibration. There is hence the possibility of impairing the acoustic performance.

Meanwhile, in the present invention, two sheets are disposed so that an edge surface of one of the sheets and an edge surface of the other are not flush with each other to thereby constitute a step portion having a stair-like shape and a seal material is provided to the step portion to seal up the liquid layer. As a result, it has become possible to attain both acoustic performance and strength on a high level.

Figure 14A:
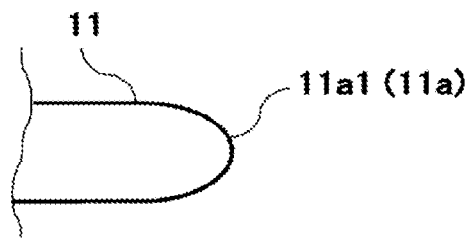
FIG. 14A is a cross-sectional view illustrating an example of a chamfered edge portion which has undergone R-chamfering.
Figure 14B:
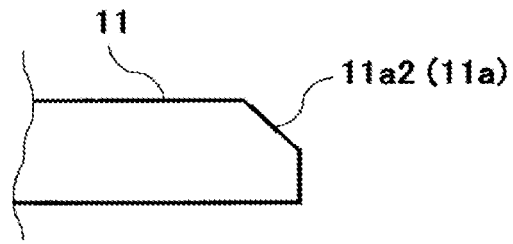
FIG. 14B is a cross-sectional view illustrating an example of a chamfered edge portion which has undergone oblique chamfering.

An edge surface 11a of the first sheet 11 can be subjected to various kinds of chamfering. FIGS. 14A and 14B show examples of chamfers formed by chamfering the edge surface 11a. FIG. 14A shows a chamfer example of the edge face 11a which has undergone R-chamfering 11a1, and FIG. 14B shows a chamfer example of the edge face 11a which has undergone oblique chamfering 11a2. A seal material 31 can be attached so as to adhere to the chamfer which has undergone such processing. In the example shown in FIG. 14A, the seal material 31 is filled into the space between the chamfer and the second sheet 12.

Figure 15A:
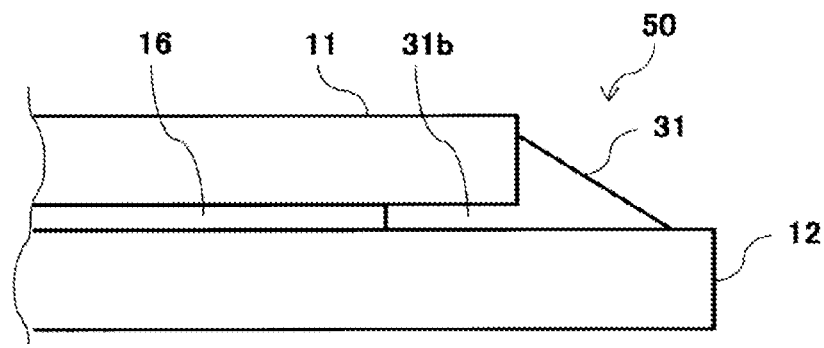
FIG. 15A is a cross-sectional view illustrating an example including a seal part having an extension which extends into the space between a first sheet and a second sheet.
Figure 15B:
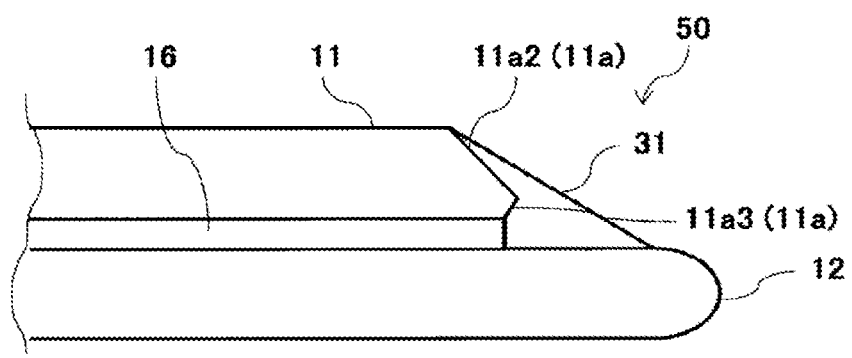
FIG. 15B is a cross-sectional view illustrating an example including a first sheet having an edge surface which has two oblique chamfers.

FIGS. 15A and 15B show modified examples of step portions 50. FIG. 15A shows an example including a seal material 31 having an extension 31b which extends into the space between a first sheet 11 and a second sheet 12. For example, in cases when a material for the seal material 31 is applied and is then cured, the curing process is controlled so that some of the seal material comes into the space between the first sheet 11 and the second sheet 12. Thus, the extension 31b can be formed. FIG. 15B shows an example including a first sheet 11 having an edge surface 11a which has two oblique chamfers. In this example, not only a first oblique chamfer 11a2, which is similar to the oblique chamfer shown in FIG. 14B, but also a second oblique chamfer 11a3, which is inclined in the direction opposite from the inclination direction of the first oblique chamfer 11a2, has been formed, and some of the seal material 31 has been filled into the space lying beneath the second oblique chamfer 11a3 and over the second sheet 12. The edge surface of the second sheet 12 has undergone the R-chamfering shown in FIG. 14A.

EXAMPLES

The present invention is specifically described below by referring to Examples, but the present invention is not limited thereto. The seal material in each of the following Examples 1 to 5 has an L-shaped contour in a cross-sectional view, the angle of the L-shape being a right angle (90°).

Example 1

Glass sheet A having dimensions of 110 mm×110 mm×0.5 mm was prepared as a second sheet, serving as substrate 1. A silicone oil (KF-96, manufactured by Shin-Etsu Chemical) having a viscosity coefficient of 3,000 mPa·s was applied as a liquid layer thereto using a dispenser (SHOTMASTER 400DS-s, manufactured by Musashi Engineering). Furthermore, glass sheet B having dimensions of 100 mm×100 mm×0.5 mm as a first sheet, serving as substrate 2, was adhered to a central portion of the glass sheet A and the two glass sheets were put together so that the liquid layer had a thickness of 3 μm. Thus, a glass stack was obtained in which the two glass sheets had been disposed so that all the edge surfaces of one of the glass sheets were not flush with the corresponding edge surfaces of the other glass sheet. Next, a UV-curable resin (XVL-14, manufactured by Kyoritsu Kagaku) was applied to the step portions of the glass sheet A and glass sheet B and cured. Thereafter, the unstacked portion of the glass sheet A was cut so that the glass sheet A came to have a size of 103 mm×103 mm×0.5 mm, thereby obtaining a glass sheet composite in which the step portions had been sealed. The compositions (mass %) and physical properties of the glass sheet A and glass sheet B are shown below. The protrusion amount in the step portions was 1.5 mm.
(Glass Sheet A) 61.5% $SiO_2$, 20% $Al_2O_3$, 1.5% $B_2O_3$, 5.5% MgO, 4.5% CaO, and 7% SrO; density, 2.7 g/cm$^3$; Young's modulus, 85 GPa; specific modulus, $3.2 \times 10^7$ m$^2$/s$^2$
(Glass Sheet B) 60% $SiO_2$, 17% $Al_2O_3$, 8% $B_2O_3$, 3% MgO, 4% CaO, and 8% SrO; density, 2.5 g/cm$^3$; Young's modulus, 77 GPa; specific modulus, $3.1 \times 10^7$ m$^2$/s$^2$ Example 2

A glass sheet composite was obtained in the same manner as in Example 1, except that the glass sheet A was replaced with an acrylic resin substrate having dimensions of 110 mm×110 mm×0.5 mm.

Example 3

Glass sheet A having dimensions of 100 mm×100 mm×0.5 mm was prepared, and a silicone oil (KF-96, manufactured by Shin-Etsu Chemical) having a viscosity coefficient of 3,000 mPa·s was evenly applied as a liquid layer thereto with a dispenser (SHOTMASTER 400DS-s, manufactured by Musashi Engineering) so as to leave a margin having a width of 5 mm from the edges. A UV-curable resin (XVL-14, manufactured by Kyoritsu Kagaku) was applied to edge portions of the glass sheet A in a line width of about 2 mm. Next, glass sheet B having dimensions of 100 mm×100 mm×0.5 mm as a first sheet, serving as substrate 2, was adhered to the glass sheet A so that the glass sheet B was offset from the central portion of the glass sheet A by 1 mm in each of the upside/downside direction and right-hand/left-hand direction, and the two glass sheets were put together under reduced pressure so that the liquid layer had a thickness of 3 μm. Thus, a glass stack was obtained in which the two glass sheets had been disposed so that all the edge surfaces of one of the glass sheets were not flush with the corresponding edge surfaces of the other glass sheet. Next, this glass stack was subjected to UV irradiation to cure the resin. The UV-cured resin which had protruded from the edges formed a structure whereby the liquid layer was sealed up in the step portions.

Example 4

Glass sheet A having dimensions of 100 mm×100 mm×0.5 mm was prepared as a second sheet, serving as substrate 1, and a silicone oil (KF-96, manufactured by Shin-Etsu Chemical) having a viscosity coefficient of 3,000 mPa·s was evenly applied as a liquid layer thereto with a dispenser (SHOTMASTER 400DS-s, manufactured by Musashi Engineering) so as to leave a margin having a width of 5 mm from the edges. A UV-curable resin (XVL-14, manufactured by Kyoritsu Kagaku) was applied to edge portions of the glass sheet A in a line width of about 2 mm. Next, glass sheet B having dimensions of 100 mm×100 mm×0.5 mm as a first sheet, serving as substrate 2, was placed over a central portion of the glass sheet A and adhered thereto so that the lower edges of the glass sheets A and B were dislocated to form an angle of 1 degree therebetween, and the two glass sheets were put together under reduced pressure so that the liquid layer had a thickness of 3 μm. Thus, a glass stack was obtained in which the two glass sheets had been disposed so that all the edge surfaces of one of the glass sheets were not flush with the corresponding edge surfaces of the other glass sheet. Next, this glass stack was subjected to UV irradiation to cure the resin. The UV-cured resin which had protruded from the edges formed a structure whereby the liquid layer was sealed up in the step portions.

Example 5

Glass sheet A having dimensions of 100 mm×100 mm×0.5 mm was prepared as a second sheet, serving as substrate 1, and a silicone oil (KF-96, manufactured by Shin-Etsu Chemical) having a viscosity coefficient of 3,000 mPa·s was evenly applied as a liquid layer thereto with a dispenser (SHOTMASTER 400DS-s, manufactured by Musashi Engineering) so as to leave a margin having a width of 5 mm from the edges. A UV-curable resin (XVL-14, manufactured by Kyoritsu Kagaku) was applied to edge portions of the glass sheet A in a line width of about 2 mm. Next, glass sheet B having an upper base of 98 mm, a lower base of 102 mm, a height of 100 mm, and a thickness of 0.5 mm as a first sheet, serving as substrate 2, was placed over a central portion of the glass sheet A (disposed equally in the upside/downside direction and right-hand/left-hand direction) and adhered to the glass sheet A so that the centers of gravity of the glass A and glass B were located in the same position, and the two glass sheets were put together under reduced pressure so that the liquid layer had a thickness of 3 µm. Thus, a glass stack was obtained in which the two glass sheets had been disposed so that two edge surfaces of one of the glass sheets were not flush with the corresponding edge surfaces of the other glass sheet. Next, this glass stack was subjected to UV irradiation to cure the resin. The UV-cured resin which had protruded from the edges formed a structure whereby the liquid layer was sealed up in the step portions.

Comparative Example 1

A glass sheet having dimensions of 100 mm×100 mm×0.5 mm was prepared as glass sheet A, and a silicone oil (KF-96, manufactured by Shin-Etsu Chemical) having a viscosity coefficient of 3,000 mPa·s was applied as a liquid layer thereto using a dispenser (SHOTMASTER 400DS-s, manufactured by Musashi Engineering). Furthermore, a glass sheet having dimensions of 100 mm×100 mm×0.5 mm as glass sheet B was adhered to a central portion of the glass sheet A and the two glass sheets were put together so that the liquid layer had a thickness of 3 µm, while making the edges of one of the glass sheets flush with the corresponding edges of the other glass sheet. Next, a UV-curable resin (XVL-14, manufactured by Kyoritsu Kagaku) was applied to the edge portions of the glass sheet A and glass sheet B and cured. Through these steps, a glass sheet composite of Comparative Example 1 was obtained. This glass sheet composite had no step portion and the edge surfaces thereof had been sealed.

Comparative Example 2

A glass sheet having dimensions of 100 mm×100 mm×0.5 mm was prepared as glass sheet A, and a silicone oil (KF-96, manufactured by Shin-Etsu Chemical) having a viscosity coefficient of 3,000 mPa·s was applied as a liquid layer thereto using a dispenser (SHOTMASTER 400DS-s, manufactured by Musashi Engineering). Subsequently, a UV-curable resin (XVL-14, manufactured by Kyoritsu Kagaku) was applied to a peripheral portion of the substrate using a dispenser. Furthermore, a glass sheet having dimensions of 100 mm×100 mm×0.5 mm as glass sheet B was adhered to a central portion of the glass sheet A and the two glass sheets were put together under vacuum so that the liquid layer had a thickness of 3 µm, while making the edges of one of the glass sheets flush with the corresponding edges of the other glass sheet. Thereafter, the UV-curable resin was cured. Through these steps, a glass sheet composite of Comparative Example 2 was obtained. This glass sheet composite had no step portion and had undergone in-plane sealing.

Comparative Example 3

A single silica glass sheet having dimensions of 100 mm×100 mm×1.0 mm was used as Comparative Example 3.

Comparative Example 4

A single acrylic resin sheet having dimensions of 100 mm×100 mm×1.0 mm was used as Comparative Example 4.
<Evaluation Methods>
(Young's Modulus, Longitudinal Wave Acoustic Velocity, Density)

The Young's modulus E and acoustic velocity V of each of the glass sheet composites and single sheets of Example 1 to Comparative Example 4 were measured at 25° C. by the ultrasonic pulse method described in Japanese Industrial Standards (JIS-R1602-1995) using a test piece having a length of 100 mm, a width of 100 mm, and a thickness of 0.5-1 mm (DL35PLUS, manufactured by Olympus Corp., was used). As for the longitudinal wave acoustic velocity of each glass sheet composite, the acoustic velocity in the sheet thickness direction was measured.

The density p of each glass sheet was measured at 25° C. by the Archimedes method (AUX320, manufactured by Shimadzu Corp.).
(Resonant Frequency)

The resonant frequency of each of the glass sheets and glass sheet composites was determined in the following manner. A vibration exciter (ET139, manufactured by Labworks) was connected to a central portion of the lower surface of a test substrate (glass sheet composite or single sheet) having a length of 100-103 mm, a width of 100-103 mm, and a thickness of 1 mm, and sinusoidal wave vibration in a range of 30-10,000 Hz was caused to the test piece in an environment having a temperature of 25° C. The resultant response was detected by an acceleration pickup disposed in a central portion of the upper surface of the test substrate and was analyzed for frequency response characteristics with an FFT analyzer (DS-3000, manufactured by ONO Sokki Co., Ltd.). The frequency at which the vibration amplitude h was maximal was taken as the resonant frequency f.
(Loss Coefficient)

The loss coefficient of each of the glass sheet composites and single sheets of Example 1 to Comparative Example 4 was evaluated in terms of the damping value represented by W/f, where f is the resonant frequency of the material determined in the measurement above and W is the frequency width at a point decreased by −3 dB from the maximum amplitude h (namely, the point of (maximum amplitude)−3 [dB]).
(Viscosity Coefficient)

The viscosity coefficient of the silicone oil used as the liquid layers was measured at 25° C. with a rotational viscometer (RVDV-E, manufactured by BROOKFIELD).
(Peeling Resistance)

Each of the glass sheet composites of Example 1 to Comparative Example 2 was cut to remove both edge portions of one side, thereby obtaining a glass sheet composite having dimensions of 25 mm (width)×100 mm. Subsequently, a glass sheet for peel test having dimensions of 25 mm×100 mm×1 mm was prepared and positioned over the main surface of the glass sheet B constituting the glass sheet composite so that the 100-mm edges of the glass sheet B were flush with those of the glass sheet for peel test. The glass sheet B and the glass sheet for peel test were fixed to each other with a pressure-sensitive adhesive so that a 25-mm edge of the glass sheet for peel test lay 5 mm outside the corresponding 25-mm width edge of the glass sheet B, thereby obtaining a glass sheet composite for peel test.

Next, the glass sheet A (acrylic resin substrate in Example 2) constituting the glass sheet composite for peel test was fixed, by vacuum suction, to a platen so that the main surfaces of the glass sheet A were horizontal. The 5 mm×25 mm portion of the glass sheet for peel test which was not bonded to the glass sheet B was vertically pulled up using AUTOGRAPH AG-X plus (manufactured by SHIMADZU) at a speed of 30 mm/min. A maximum load which was measured during the pulling was taken as peel strength. The results are summarized in Tables 1 and 2.

TABLE 1

|  | Example 1 | Example 2 | Example 3 | Example 4 | Example 5 |
|---|---|---|---|---|---|
| Material of substrate 1 | glass sheet A | acrylic resin | glass sheet A | glass sheet A | glass sheet A |
| Material of substrate 1 (glass sheet) | glass sheet B | glass sheet B | glass sheet B | glass sheet B | glass sheet B |
| [Sheet thickness (substrate 1), mm]/ [sheet thickness (substrate 2), mm] | 0.5/0.5 | 0.5/0.5 | 0.5/0.5 | 0.5/0.5 | 0.5/0.5 |
| Liquid layer | silicone | silicone | silicone | silicone | silicone |
| Thickness of liquid layer, μm | 3 | 3 | 3 | 3 | 3 |
| Viscosity coefficient of liquid layer, Pa·s | 3.0 | 3.0 | 3.0 | 3.0 | 3.0 |
| Mode of sealing | in-plane + step-portion sealing | in-plane + step-portion sealing | in-plane + step-portion sealing[1] | in-plane + step-portion sealing[2] | in-plane + step-portion sealing[3] |
| Longitudinal wave acoustic velocity, m/s | 6100 | 6100 | 6100 | 6100 | 6100 |
| Damping value | $5.2 \times 10^{-2}$ | $1.1 \times 10^{-1}$ | $5.1 \times 10^{-2}$ | $5.0 \times 10^{-2}$ | $5.0 \times 10^{-2}$ |
| Peel strength, N/25 mm | glass breakage | glass breakage | glass breakage | glass breakage | glass breakage |

[1] Step-portion sealing accompanying two-sheet offset.
[2] Step-portion sealing accompanying two-sheet axial rotation.
[3] Step-portion sealing accompanying different plan-view shapes of two sheets.

TABLE 2

|  | Comparative Example 1 | Comparative Example 2 | Comparative Example 3 | Comparative Example 4 |
|---|---|---|---|---|
| Material of substrate 1 | glass sheet A | glass sheet A | $SiO_2$ glass (single sheet) | acrylic resin (single sheet) |
| Material of substrate 1 (glass sheet) | glass sheet B | glass sheet B | — | — |
| [Sheet thickness (substrate 1), mm]/ [sheet thickness (substrate 2), mm] | 0.5/0.5 | 0.5/0.5 | 1.0 | 1.0 |
| Liquid layer | silicone | silicone | — | — |
| Thickness of liquid layer, μm | 3 | 3 | — | — |
| Viscosity coefficient of liquid layer, Pa·s | 3.0 | 3.0 | — | — |
| Mode of sealing | edge-surface sealing | in-plane sealing | — | — |
| Longitudinal wave acoustic velocity, m/s | 6100 | 6100 | 6000 | 2700 |
| Damping value | $7.0 \times 10^{-2}$ | $1.1 \times 10^{-2}$ | $9.5 \times 10^{-3}$ | $5.1 \times 10^{-2}$ |
| Peel strength, N/25 mm | 20 | 40 | — | — |

In the case where two glass sheets had been fixed by sealing step portions (Example 1, 3 to 5), the glass sheet composites each had a longitudinal wave acoustic velocity of $6.0 \times 10^3$ m/s or higher and a damping value at 25° C. of $7 \times 10^{-2}$ or less. These properties were excellent. In the peel strength evaluation, glass sheet breakage occurred first. Thus, these glass sheet composites were excellent in terms of both acoustic performance and peel strength.

In the case where a glass sheet and an acrylic resin sheet had been fixed by sealing step portions (Example 2), the glass sheet had a longitudinal wave acoustic velocity of $6.0 \times 10^3$ m/s or higher and a damping value at 25° C. of $1.1 \times 10^{-1}$ or higher. These properties were excellent. In the peel strength evaluation, glass sheet breakage occurred first. Thus, this glass sheet composite was excellent in terms of both acoustic performance and peel strength.

In the case where two glass sheets had been fixed by edge-surface sealing (Comparative Example 1), the glass sheet composite each had a longitudinal wave acoustic velocity of $6.0 \times 10^3$ m/s or higher and a damping value at 25° C. of $7 \times 10^{-2}$ or less. These properties were excellent. However, the peel strength was 20 N/25 mm, which was significantly low. This glass sheet composite was inferior in peel strength to the configurations of the Examples.

In the case where two glass sheets had been fixed by in-plane sealing (Comparative Example 2), the glass sheet composite each had a longitudinal wave acoustic velocity of $6.0 \times 10^3$ m/s or higher but had a damping value at 25° C. as low as $1 \times 10^{-2}$ or below. Furthermore, the peel strength was 40 N/25 mm. This glass sheet composite was inferior in acoustic performance and peel strength to Examples 1 and 2.

In the case where a single silica glass sheet (single $SiO_2$ glass sheet) was used (Comparative Example 3), this glass sheet each had a longitudinal wave acoustic velocity of $6.0 \times 10^3$ m/s or higher but had a damping value at 25° C. as low as $1 \times 10^{-2}$ or below. This glass sheet was unsuitable for use as a diaphragm. In the case where a single acrylic resin sheet was used (Comparative Example 4), this resin sheet had a damping value at 25° C. of $2.2 \times 10^{-2}$, which was satisfactory. However, the longitudinal wave acoustic velocity was as low as $2.7 \times 10^3$ m/s, showing that this resin sheet was unsuitable for use as a diaphragm.

This application claims priority based on Japanese Patent Application No. 2017-032650, which was filed with the Japanese Patent Office on Feb. 23, 2017. The entire contents of Japanese Patent Application No. 2017-032650 are incorporated in this application by reference.

INDUSTRIAL APPLICABILITY

The glass sheet composite according to the present invention has a high longitudinal wave acoustic velocity and a high loss coefficient and can have improved strength. This glass sheet composite is hence suitable for use, for example, as diaphragms in loudspeakers, microphones, earphones, mobile devices, etc. and as opening members for buildings or vehicles.

DESCRIPTION OF REFERENCE NUMERALS

- 10 Glass sheet composite
- 11 First sheet
- 12 Second sheet
- 16 Liquid layer
- 21 Cover layer (coating or film)
- 30 Frame
- 31 Seal material
- 32 Seal member
- 40 Seal tape
- 50 Step portion

The invention claimed is:

1. A glass sheet composite, comprising:
   two sheets;
   a liquid layer held between the two sheets; and
   a seal material,
   wherein at least one of the two sheets is a glass sheet,
   wherein the two sheets are disposed so that an edge surface of one of the two sheets and an edge surface of the other sheet are not flush with each other to constitute a step portion having a stair-like shape in a cross-sectional view,
   the seal material is provided to the step portion to seal up at least the liquid layer, and
   the liquid layer held between the two sheets is continuous.

2. The glass sheet composite according to claim 1, wherein the seal material adheres to the edge surface of one of the two sheets, an edge surface of the liquid layer, and a main surface of the other sheet in the step portion.

3. The glass sheet composite according to claim 2, wherein the seal material, in a cross-sectional view, has an L-shaped contour extending along the edge surface of one of the sheets, the edge surface of the liquid layer, and the main surface of the other of the sheets.

4. The glass sheet composite according to claim 1, wherein the seal material has a taper surface.

5. The glass sheet composite according to claim 1, wherein the glass sheet has a specific modulus of $2.5 \times 10^7$ $m^2/s^2$ or higher.

6. The glass sheet composite according to claim 1, wherein the liquid layer has a viscosity coefficient at 25° C. of $1 \times 10^{-4}$ to $1 \times 10^3$ Pa·s and a surface tension at 25° C. of 15-80 mN/m.

7. The glass sheet composite according to claim 1, wherein the liquid layer has a thickness which is $1/10$ or less of a total thickness of the two sheets when the total thickness of the two sheets is 1 mm or less, and 100 μm or less when the total thickness of the two sheets is more than 1 mm.

8. The glass sheet composite according to claim 1, wherein the glass sheet is a physically strengthened glass sheet and/or a chemically strengthened glass sheet.

9. The glass sheet composite according to claim 1, wherein the two sheets each have a thickness of 0.01-15 mm.

10. The glass sheet composite according to claim 1, wherein the liquid layer comprises at least one member selected from the group consisting of a dimethyl silicone oil, a methyl phenyl silicone oil, a methyl hydrogen silicone oil, and a modified silicone oil.

11. The glass sheet composite according to claim 1, wherein the seal material comprises at least one member selected from the group consisting of a poly(vinyl acetate)-based material, a poly(vinyl chloride)-based material, a poly(vinyl alcohol)-based material, an ethylene-copolymer-based material, a poly(acrylate)-based material, a cyanoacrylate-based material, a saturated-polyester-based material, a polyamide-based material, a linear-polyimide-based material, a melamine resin, a urea resin, a phenolic resin, an epoxy-based material, a polyurethane-based material, an unsaturated-polyester-based material, a reactive acrylic material, a rubber-based material, a silicone-based material, and a modified-silicone-based material.

12. The glass sheet composite according to claim 1 further comprising another glass sheet.

13. The glass sheet composite according to claim 1, wherein at least one of the glass sheet is made of a laminated glass.

14. The glass sheet composite according to claim 1, wherein at least one outermost surface has a coating or film formed thereon.

15. The glass sheet composite according to claim 1, which has a curved surface shape.

16. A diaphragm, comprising:
   the glass sheet composite according to claim 1, and
   at least one vibrator disposed on one or both surfaces of the glass sheet composite.

17. The diaphragm according to claim 16, which has a circumferential length of 1 m or larger.

18. An opening member, comprising:
   the glass sheet composite according to claim 1, or
   a diaphragm comprising the glass sheet composite according to claim 1 and at least one vibrator disposed on one or both surfaces of the glass sheet composite.

19. The glass sheet composite according to claim 1, wherein the seal material is not interposed between the two sheets.

20. The glass sheet composite according to claim 1, wherein a thickness of the liquid layer is consistent throughout the glass sheet composite.

* * * * *